United States Patent [19]

Fukakusa

[11] Patent Number: 5,315,454
[45] Date of Patent: May 24, 1994

[54] LOADING METHOD OF MAGNETIC HEAD AND MAGNETIC DISC APPARATUS

[75] Inventor: Masaharu Fukakusa, Kumamoto, Japan

[73] Assignee: Matsushita Electric Industrial Co., Ltd., Osaka, Japan

[21] Appl. No.: 842,302

[22] Filed: Feb. 26, 1992

[30] Foreign Application Priority Data

Feb. 27, 1991 [JP] Japan .................................. 3-032687

[51] Int. Cl.$^5$ ............................................. G11B 21/02
[52] U.S. Cl. ...................................... 360/75; 360/109; 324/212
[58] Field of Search ......................... 360/75, 103, 109; 324/212

[56] References Cited

U.S. PATENT DOCUMENTS

| 4,755,892 | 7/1988 | Carteau et al. | 360/75 |
| 4,843,502 | 6/1959 | Tagawa | 360/75 |
| 4,954,904 | 9/1990 | Goor | 360/109 |

FOREIGN PATENT DOCUMENTS 0177479  9/1985  Japan .................................. 360/75
0051019  3/1987  Japan .................................. 360/109

Primary Examiner—Thomas E. Denion
Attorney, Agent, or Firm—Lowe, Price, LeBlanc & Becker

[57] ABSTRACT

A method of loading a negative pressure type magnetic head with respect to a magnetic recording medium. For loading the magnetic head is brought close to the medium to float above a surface of the medium so as to satisfy the following conditions when reaching a region of air flow occurring due to rotation of said magnetic recording medium.

$$+0.1° \leq \theta_P \leq +1.8°$$

$$-1.2° \leq \theta_R \leq +1.2°$$

$$VL \leq 100 \text{ [mm/sec]}$$

where $\theta_P$ represents a pitching angle of the magnetic head, $\theta_R$ designates a rolling angle of said magnetic head, and VL denotes a speed of the magnetic head taken when being brought close to the medium.

24 Claims, 17 Drawing Sheets

LOADING METHOD OF MAGNETIC HEAD AND MAGNETIC DISC APPARATUS

BACKGROUND OF THE INVENTION

The present invention relates to a magnetic disc apparatus and loading method of a magnetic head for use in magnetic recording/reproducing systems which record and read out data on and from a magnetic recording medium.

FIG. 1 is a perspective view showing an arrangement of a conventional magnetic disc drive apparatus. In FIG. 1, illustrated at numeral 2 is a flexible member comprising a leaf spring one end portion of which is coupled to an arm 1. The flexible member 2 can flexibly be bent at the vicinity of the coupling portion to the arm 1 in a direction closer to a disc 5. At the top portion of the flexible member 2 there is provided a gimbal 3 which, as illustrated in FIG. 2, comprises a frame portion 3h and a tongue-like member 3i. At the vicinity of the top portion of the tongue-like member 3i there is formed a semi-spherical projection 3g which comes into contact with the flexible member 2. Illustrated at numeral 4 is a magnetic head which is fixedly secured to the tongue-like member 3i of the gimbal 3 and which is constructed as illustrated in FIG. 3. In FIG. 3, reference 4a represents a slider made of a magnetic material such as ferrite and provided with a U-shaped floating rail 4b generating a positive pressure and having a step portion 4c thereon. The reference 4d denotes a concave portion surrounded by the floating rail 4b where a negative pressure generates. Further, the references 4e and 4f are cores which are respectively connected to the slider 4a with non-magnetic materials 4g and 4h for acting as magnetic gaps being interposed therebetween. The core 4e is wound by a conductive wire 4i. Here, only the core 4e effects the magnetic recording and reproduction. Air flows from the sides indicated by characters A and C toward the sides indicated by characters B and D.

Returning again to FIG. 1, between the flexible member 2 and the disc 5 there is disposed a load pin 8 which is directly connected to a solenoid 9. The solenoid 9 moves load pin 8 up and down so as to cause the magnetic head 4 to be displaced toward the disc 5.

Operation of the conventional magnetic disc drive apparatus thus arranged will be described hereinbelow with reference to FIGS. 4A to 4C. In loading, the flexible member 2 is first lifted by the load pin 8 as illustrated in FIG. 4A so that the magnetic head 4 takes the state separated from the disc 5. Secondly, in response to supply of a current to the solenoid 9 after the disc 5 reaches a predetermined rotational speed, the load pin 8 moves so as to be closer to the disc 5. Since a load is applied to the flexible member 2 in the direction closer to the disc 5, the flexible member 2 flows the movement of the load pin 8 and moves toward the disc 5 so that the magnetic head 4 approaches the disc 5 as illustrated in FIG. 4B. When the magnetic head 4 further approaches the disc 5, a negative pressure generates with respect to the magnetic head 4 whereby the magnetic head 4 is drawn toward the disc 5 and floats as illustrated in FIG. 4C. In the floating state, the magnetic head 4 floats under the balance between the positive pressure, the negative pressure and the load of the flexible member 2, and takes the pitching and rolling actions about the projection 3g of the gimbal 3 so as to follow the movement such as vibration of the disc 5. Further, in the floating state, a current always flows through the electromagnetic solenoid 9 whereby the flexible member 2 does not come into contact with the load pin 8 even if the magnetic head 4 moves with respect to the data track on the disc 5 for recording or reproduction. In response to the completion of given recording or reproduction, the flexible member 2 moves up to the position of the load pin 8 and the rotational speed of the disc 5 decreases. In addition, the current to the solenoid 9 is cut whereby the solenoid 9 tends to return to the original position and at the same time the load pin 8 causes the flexible member 2 to separate from the disc 5 so that the magnetic head 4 is separated from the disc 5.

The magnetic disc drive apparatus thus arranged is designed such that the magnetic head 4 just floats on the disc 5 when the surface of the magnetic head 4 becomes parallel to the disc 5 in bringing the magnetic head 4 close to the disc 5. Further, in the case that the magnetic head 4 floats on the disc 5, the separation between the flexible member 2 and the disc 5 is about 1 mm, and in order for preventing the load pin 8 from coming into contact with the disc 5, the load pin 8 is required to be slenderized and hence the load pin 8 is arranged to have a thin-plate-like configuration or a thin-pin-like configuration. When the flexible member 2 is supported by the load pin 8, the load pin 8 is bent and the flexible member 2 is supported by the load pin 8 so as to be inclined along the load pin 8, because the flexible member 2 takes the state that approaches the disc 5. FIGS. 5A and 5B show these states.

FIG. 6 shows another conventional apparatus where a supporting member 10 is provided in place of the load pin 8 and the electromagnetic solenoid 9 and FIGS. 7A to 7C are illustrations for describing the operation of the FIG. 6 conventional apparatus. FIG. 7A shows the state that the disc 5 stops to rotate and the magnetic head 4 is separated from the disc 5. In FIG. 7A, the flexible member 2 is supported by the supporting member 10 and bent at the vicinity of the arm 1 in the direction closer to the disc 5. That is, the load is arranged to be applied in the direction that the flexible member 2 is brought closer to the disc 5. Further, the flexible member 2 is provided so as to be movable in the directions that traverses the data track of the disc 5. In response to moving to the inner circumference side of the disc 5, the flexible member 2 moves to slide on the supporting member 10 as illustrated in FIG. 7B. When further moving on the supporting member 10, the flexible member 2 is slid down therefrom so as to be displaced onto the disc 5 and at the same time the magnetic head 4 floats above the disc 5 as illustrated in FIG. 7C. After the completion of the recording or reproduction, the flexible member 2 moves toward the supporting member 10 so as to be put on the supporting member 10. At this time, the load is applied to the magnetic head 4 in the direction that separates from the disc 5, and the rotational speed of the disc 5 decreases and the magnetic head 4 returns to the original position (FIG. 7A).

This arrangement does not require that the supporting member 10 moves and does not require that the supporting member has a thin configuration unlike the first-mentioned conventional apparatus. However, as illustrated in FIG. 7B, immediately before the separation of the flexible member 2 from the supporting member 10, an eccentric force is applied to the flexible member 2 so that the flexible member 2 displaces in its width-direction so as to incline the magnetic head 4. In addition, after the separation of the flexible member 2 from the supporting member 10, the flexible member 2 rapidly displaces toward the disc 5 by its restoring force so that the magnetic head 4 approaches the disc 5 at an extremely high speed.

Here, the magnetic head 4 is brought closer to the disc 5 from the air-inlet side (A and C sides in FIG. 3) so that the magnetic head 4 moves in the direction perpendicular to the surface of the disc 5 within the region in which air flow occurs on the surface of the disc 5 by the rotation of the disc 5. This provides the possibility that the magnetic head 4 comes into contact with the disc 5 to damage the disc 5 because of no generation of a sufficient positive pressure.

Moreover, although the magnetic head 4 is designed so as to float on the disc 5 when the surface of the magnetic head 4 substantially becomes parallel to the surface of the disc 5, the space between the arm 1 and the disc is actually irregular due to the error in the machining accuracy of the arm 1 and the error in assembling whereby the air-inlet side (A, C in FIG. 3) of the magnetic head 4 can approach the disc 5 preceding the air-outlet side (B, D in FIG. 3) or vice versa. FIGS. 8A and 8B show this state. FIG. 8A shows the case that the error of the space between the arm 1 and the magnetic head 4 occurs such that the arm 1 approaches the disc 5, i.e., the case that the magnetic head 4 approaches the disc 5 from the air-inlet side, and FIG. 8B shows the case that the error therebetween occurs such that the arm 1 is separated from the disc 5, i.e., the case that the magnetic head 4 approaches the disc 5 from the air-outlet side. These states can also occur due to the other errors such as an error in thickness.

In a general magnetic disc drive apparatus, when the magnetic head 4 floats, the space between the magnetic gap of the magnetic head 4 and the disc 5 is set to be as extremely small as 0.1 to 0.2 microns, and therefore, for stably floating the magnetic head 4 above the disc 5, the magnetic head 4 is required to be substantially parallel to the disc 5 before floating and the positive pressure due to air flow caused by the rotation of the disc 5 acts as a force to parallel the magnetic head 4 with respect to the disc 5. However, when the inclination between the air-inlet side and the air-outlet side is extremely great, difficulty is encountered to parallel the magnetic head 4 with respect to the disc 5 whereby the magnetic head 4 comes into contact therewith.

In the first-mentioned conventional apparatus, in response to a current whose value is above a predetermined value, the solenoid 9 operates to cause the load pin 8 to approach the disc 5, and in response to a current whose value is below a predetermined value, the solenoid 9 operates to cause the load pin 8 to separate from the disc 5. At this time, the solenoid 9 operates at an extremely high speed so that the magnetic head 4 moves at the corresponding speed in the directions perpendicular to the disc 5. In the case that the magnetic head 4 approaches the disc 5 at an extremely high speed under the condition that the magnetic head 4 is inclined with respect to the disc 5, the magnetic head 4 can approach the disc 5 with a time period shorter than the time period taken for paralleling the magnetic head 4 by the positive pressure, thereby causing the magnetic head 4 to come into contact with the disc 5. Similarly, the second-mentioned conventional apparatus has the same problem because the flexible member 2 rapidly approaches the disc 5 by the spring force of the flexible member 2. In addition, in the case of the second-mentioned conventional apparatus, a load is always applied to the flexible member 2 in the direction that the magnetic head 4 approaches the disc 5 even after the magnetic head 4 has floated above the disc 5, and therefore there is the possibility that the magnetic head 4 is brought into contact with the disc 5 due to vibration of the arm 1 and the like. These problems do not permit data to be written at the head-loading area on the disc 5 but require a specific loading area on the disc 5 for preventing the previously written data from being broken.

SUMMARY OF THE INVENTION

It is therefore an object of the present invention to provide a loading method of a magnetic head and magnetic disc apparatus which is capable of preventing the magnetic head from coming into contact with the disc when loading to prevent the damage of the magnetic head and the disc and which does not require the provision of the loading area on the disc so as to increase the recording capacity of the disc.

One feature of this invention is that the pitching angle and rolling angle are respectively set to be in predetermined ranges when the magnetic head is in the air flow region and the magnetic head is brought close to the disc. Thus, a great positive pressure occurs with respect to the magnetic head so as to generate a negative pressure whereby the inclination of the magnetic head can be corrected so that the magnetic head substantially becomes parallel to the disc before the magnetic head reaches the floating position above the disc. Even if the magnetic head is rapidly drawn to the disc due to the negative pressure, because of the positive pressure, it is possible to prevent the magnetic head from coming into contact with the disc. Since it is possible that the magnetic head floats above the disc without contacting with the disc, there is no need for providing an area for the floating of the magnetic head, thereby increasing the capacity for storage of information on the disc. In addition, since there is no abrasion of the recording/reproducing gap of the magnetic head, the width of the track can be narrowed to allow the high-density recording.

Preferably, the pitching angle $\theta_P$ and the rolling angle $\theta_R$ are set as follows under the condition that the loading speed of the magnetic head is below 100 [mm/sec].

$$+0.1° \leq \theta_P \leq +1.8°$$

$$-1.2° \leq \theta_R \leq +1.2°$$

More preferably, they are set as follows under the condition that the loading speed is below 50 [mm/sec].

$$+0.15° \leq \theta_P \leq +1.5°$$

$$-0.6° \leq \theta_R \leq +0.6°$$

A further feature of this invention is that a load is applied to the magnetic head in the direction to the disc during the approaching to the disc and for a predetermined time period from the floating of the magnetic head and thereafter applied in the separating direction from the disc, and further the load value is set to be greater than the positive pressure generated with respect to the magnetic head. Thus, the magnetic head can reach the negative-pressure generating position to surely float above the disc, and since the load is always applied in the separating direction from the disc during the floating, it is possible to prevent the magnetic head from coming into contact with the disc due to the vibration of the disc, a head-supporting arm and others. In addition, even if the disc stops to rotate while the magnetic head floats, the magnetic head can be separated from the disc so as to prevent the data on the disc from being broken and further to prevent the magnetic head from being absorbed to the disc so as not to impede the rotation of the disc.

According to this invention, there is provided a magnetic disc apparatus comprising a magnetic disc, an arm movable in directions substantially parallel to a surface of the magnetic disc, a flexible member one end portion of which is attached to the arm, a negative pressure type magnetic head attached through a gimbal to the other end portion of the flexible member, and loading means for loading the magnetic head above the magnetic disc by pressing the flexible member toward the magnetic disc, wherein the magnetic head is equipped with an air-inlet portion for introduction of air and an air-outlet portion for discharge of air which are disposed along its longitudinal axis, for loading the magnetic head being brought close to the magnetic disc to float above a surface of the magnetic disc so as to satisfy the following conditions when reaching a region of air flow occurring due to rotation of the magnetic disc:

$$+0.1° \leq \theta_P \leq +1.8°$$

$$-1.2° \leq \theta_R \leq +1.2°$$

$$VL \leq 100 \text{ [mm/sec]}$$

or $$+0.15° \leq \theta_P \leq +1.5°$$

$$-0.6° \leq \theta_R \leq +0.6°$$

$$VL \leq 50 \text{ [mm/sec]}$$

where $\theta_P$ represents a pitching angle of the magnetic head which is an angle made between the longitudinal axis of the magnetic head and the surface of the magnetic disc, the pitching angle taking a positive (+) angle when the air-inlet portion is more separated from the surface of the magnetic disc as compared with the air-outlet portion; $\theta_R$ designates a rolling angle of the magnetic head which is an angle made between the surface of the magnetic disc and a traversal axis perpendicular to the longitudinal axis of the magnetic head, the rolling angle taking a positive (+) angle when a portion of the magnetic head which is on the traversal axis and far away from the center of the magnetic disc is more separated from the surface of the magnetic disc as compared with a portion thereof which is on the traversal axis and near the center of the magnetic disc; and VL denotes a speed of the magnetic head taken when being brought close to the magnetic disc.

The loading means comprises a load pin for pressing the flexible member and driving means for moving the load pin, and the load pin is arranged to extend in a direction substantially parallel to the surface of the magnetic disc and the moving means moves the load pin in a direction substantially perpendicular to the surface of the magnetic disc. The driving means operates in response to a current introduced thereinto and changes a speed of the movement of the load pin in accordance with a value of the introduced current.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
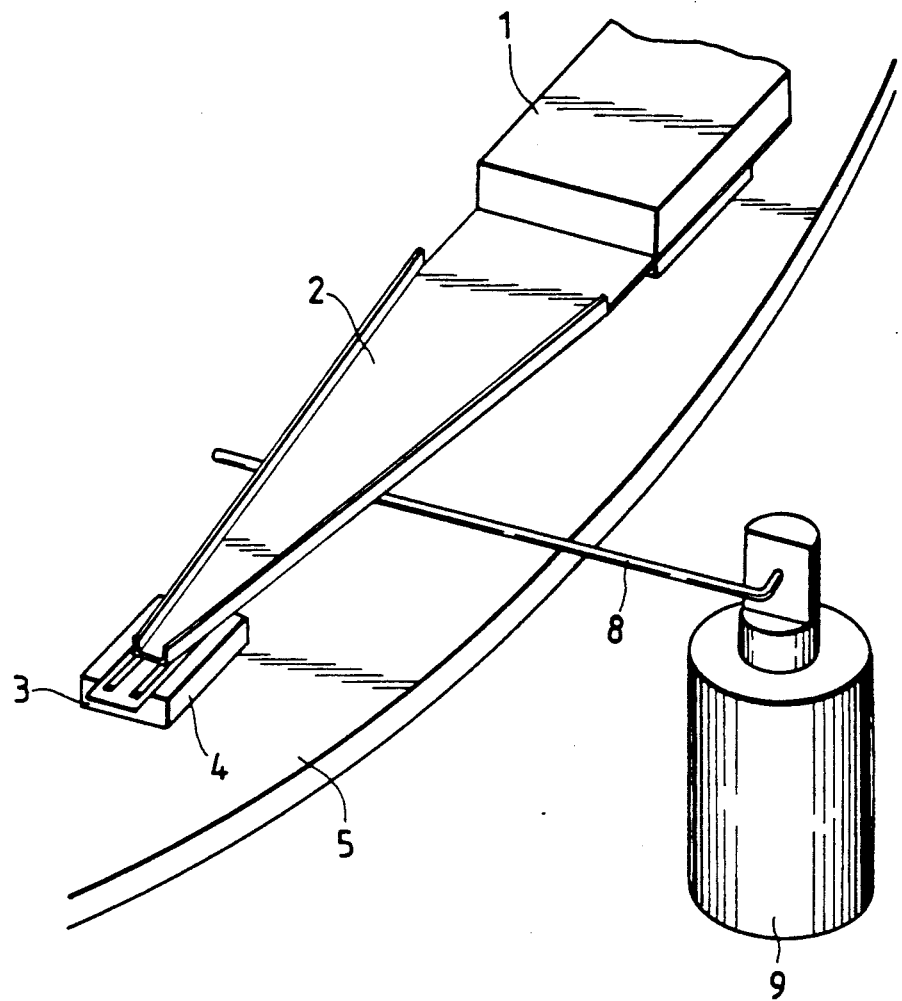
FIGS. 1 to 5C are illustrations for describing a conventional magnetic disc apparatus.
Figure 2:
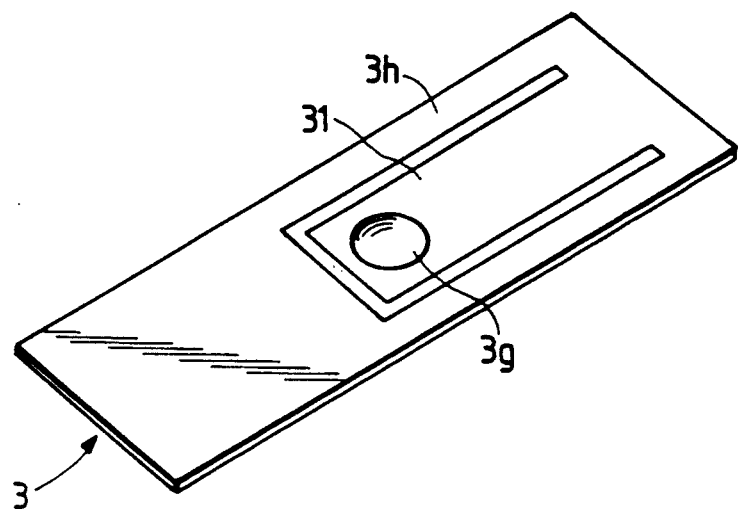
Figure 3:
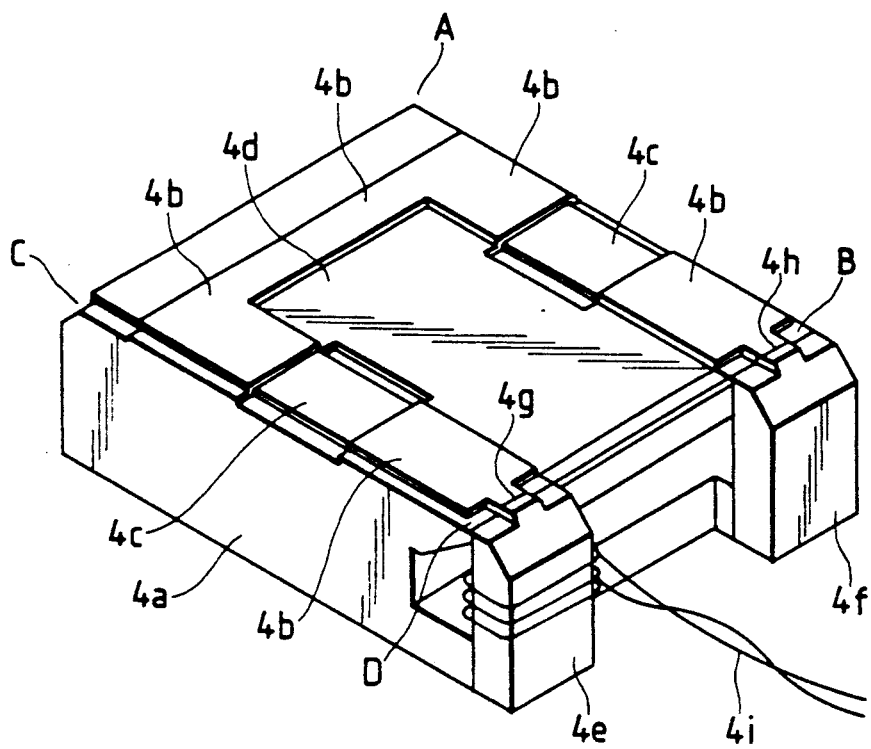
Figure 4A:
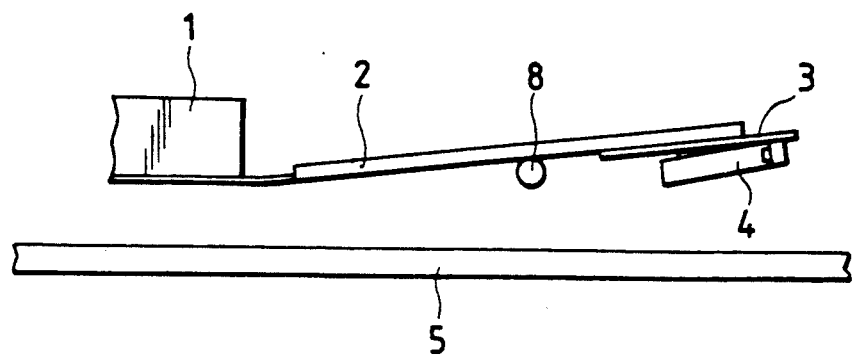
Figure 4B:
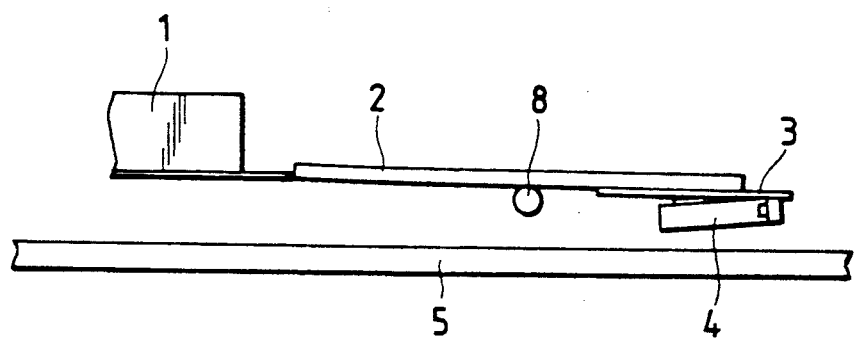
Figure 4C:
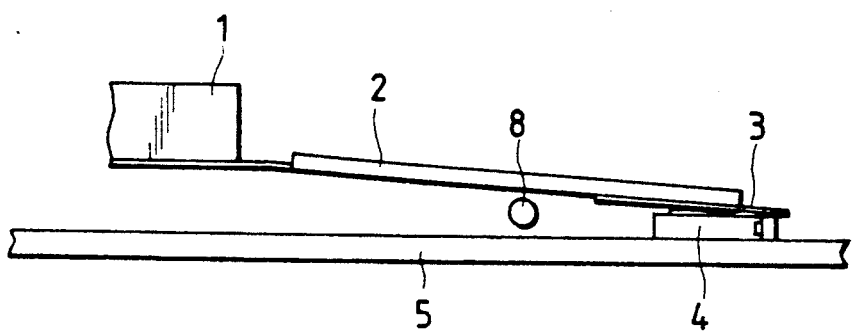
Figure 5A:
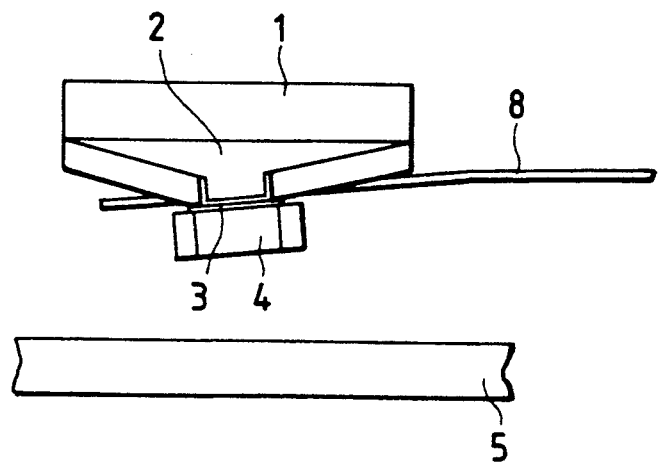
Figure 5B:
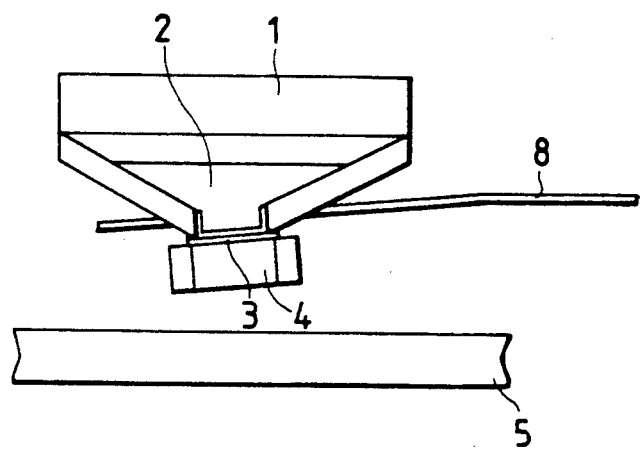
Figure 5C:
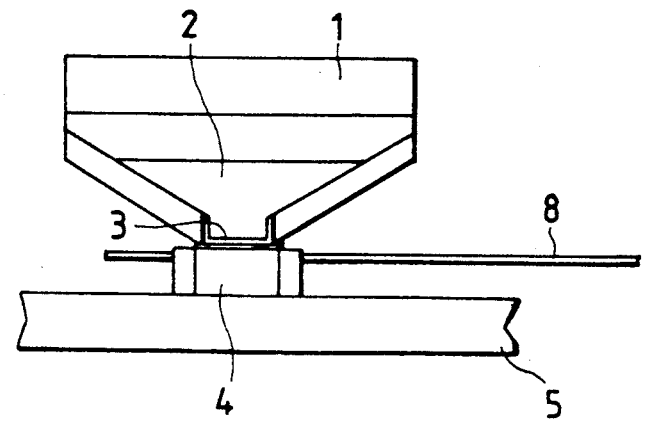
Figure 6:
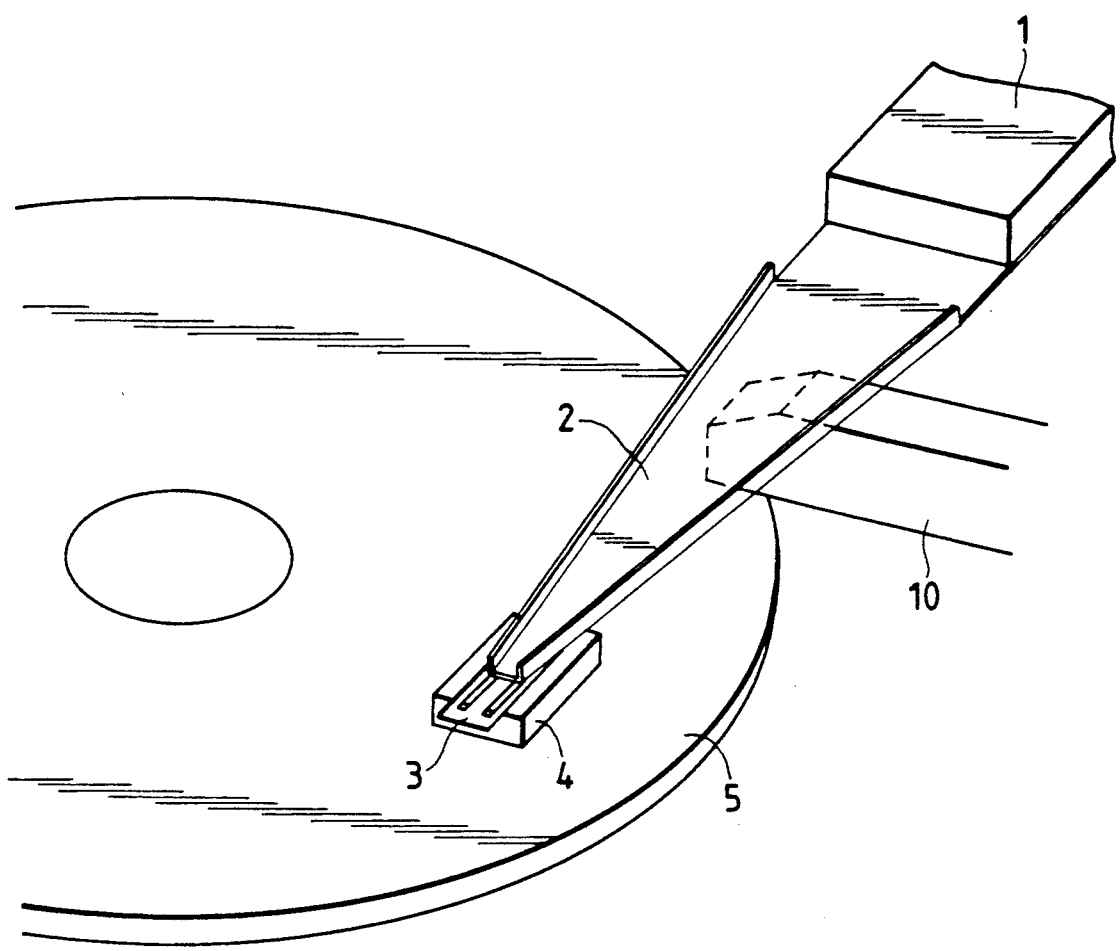
FIGS. 6 to 8B are illustrations for describing another conventional magnetic disc apparatus.
Figure 7A:
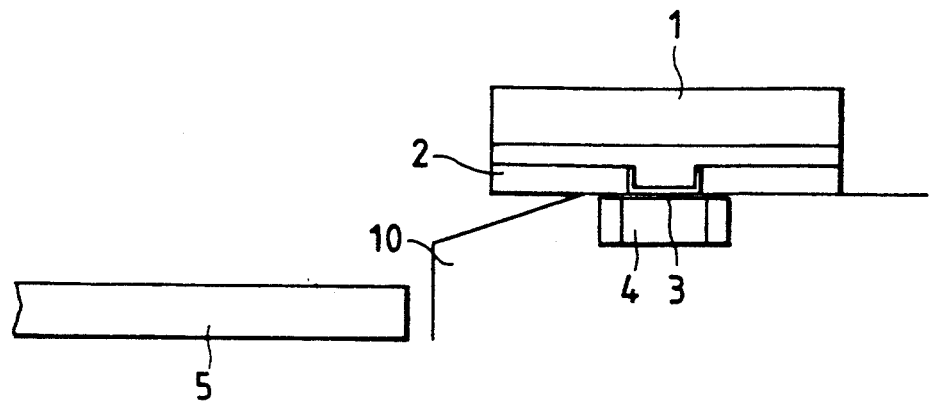
Figure 7B:
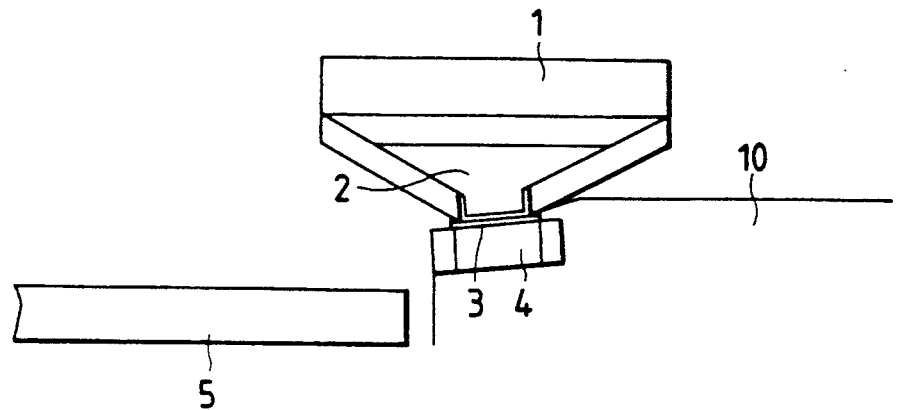
Figure 7C:
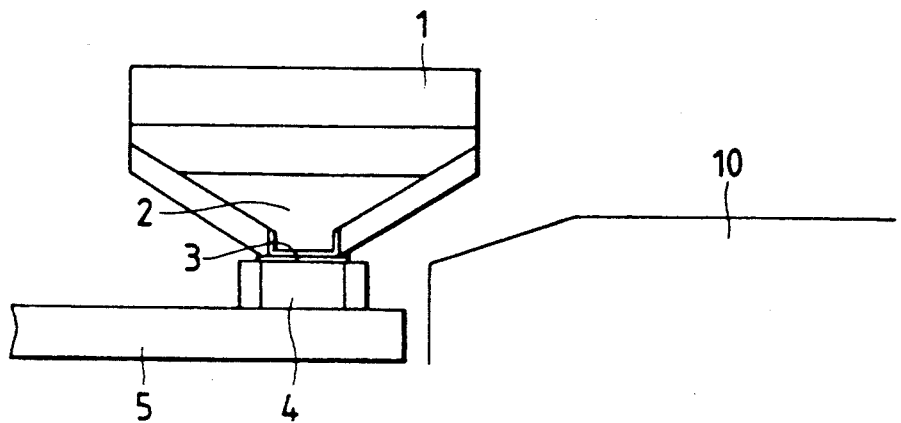
Figure 8A:
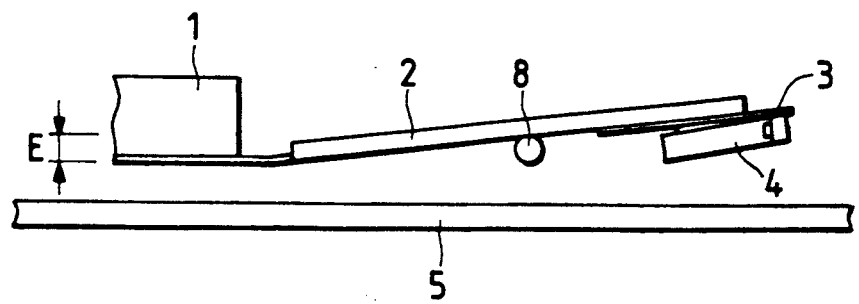
Figure 8A:
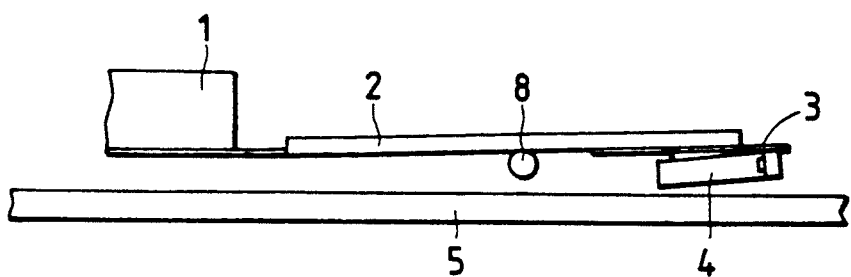
Figure 8B:
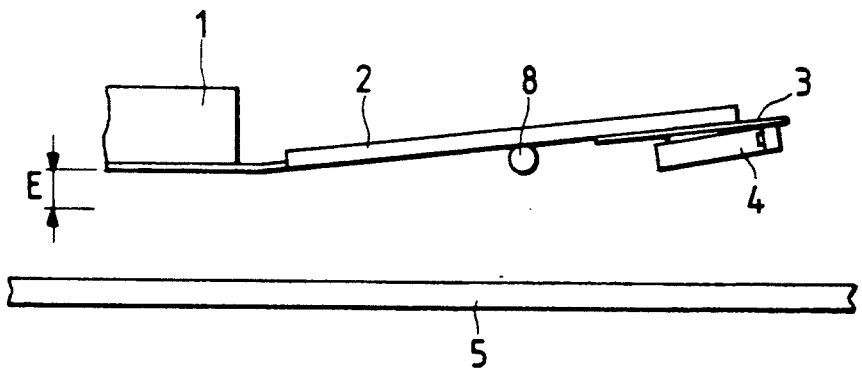
Figure 8B:
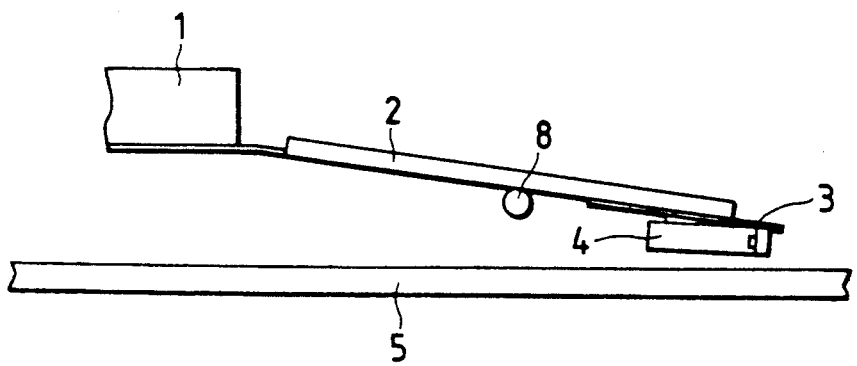
Figure 9:
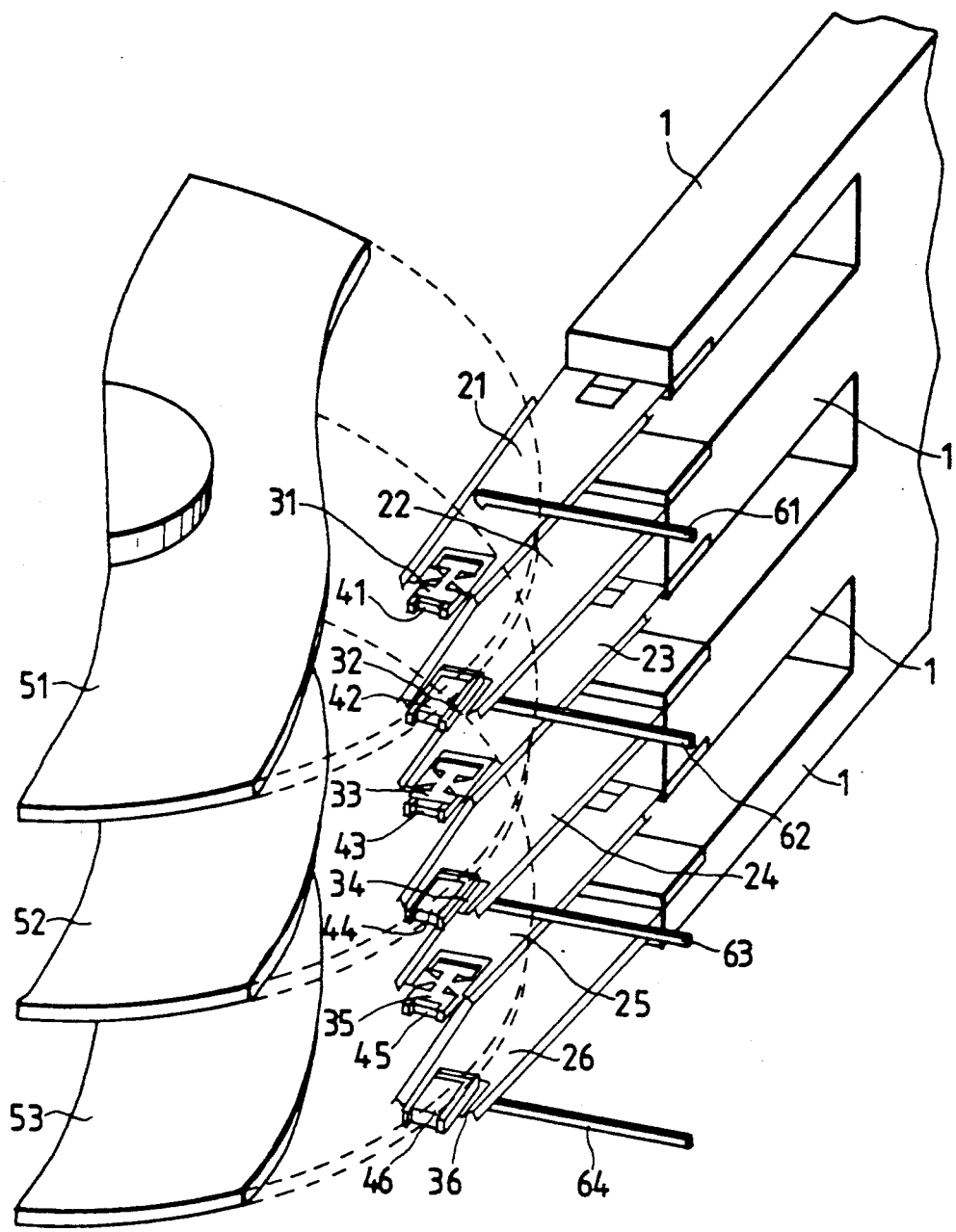
FIG. 9 is a perspective view showing an arrangement of a magnetic disc apparatus according to an embodiment of the present invention.
Figure 10:
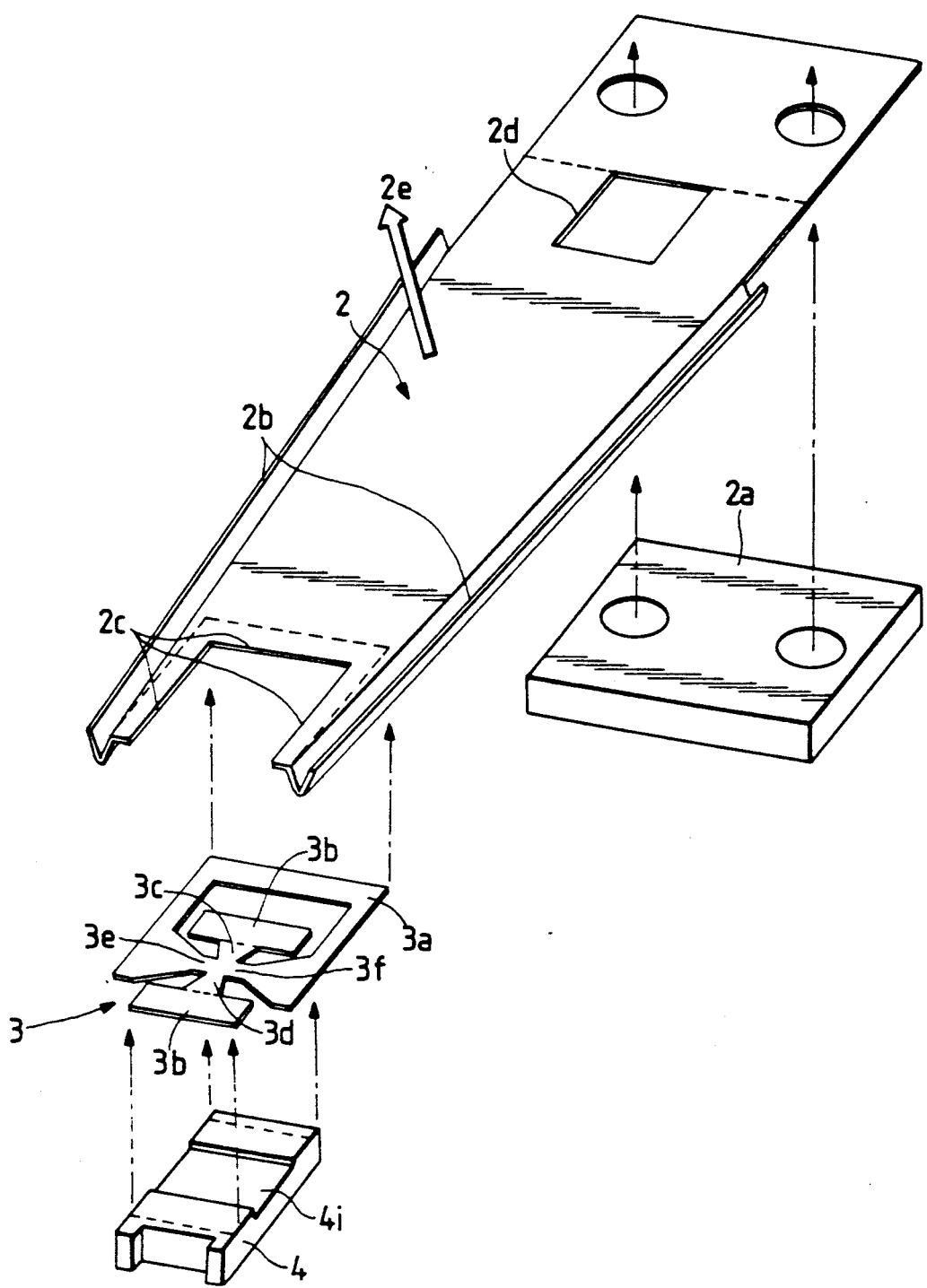
FIG. 10 is an exploded view showing a flexible member and gimbal to be used in the FIG. 9 magnetic disc apparatus.

Referring now to FIG. 9, there is illustrated an arrangement of a magnetic disc apparatus according to an embodiment of the present invention. In FIG. 9, illustrated at numerals 21 to 26 are flexible members each substantially having the same structure and being fixedly secured to an arm 1 and illustrated at numerals 31 to 36 are gimbals each substantially having the same structure and being fixedly secured to each of the flexible members 21 to 26. Further, designated at numerals 41 to 46 are magnetic heads for recording and reproducing information data on and from discs 51 to 53, the magnetic heads 41 to 46 being respectively fixed to the gimbals 31 to 36 and having an arrangement as shown in FIG. 3. FIG. 10 shows each of the flexible members 21 to 26 and each of the gimbals 31 to 36. In FIG. 10, for example, the flexible member 21 comprises a metal-made plate section 2 and a mounting section 2a, the mounting section 2a being fixedly attached through screws or the like to one end portion of the plate section 2 which is fixedly secured to the arm 1. At both sides of the plate section 2 there are provided bent sections 2b each of which is bent twice to increase the rigidity of the flexible member 21 so as to improve the vibration property of the flexible member 21. The plate section 2 has a square hole 2d formed at the vicinity of the fixing portion of the mounting section 2a and bent about the square hole 2d portion in a direction indicated by an arrow 2e. That is, when the magnetic head (for example, 41) is in the floating state above the disc 51, a load is applied in the direction that the magnetic head 41 separates from the disc 51. The load value to the magnetic head 41 is arranged to depend upon the size of the square hole 2d.

Further, the top portion of the plate section 2 is formed to have an opening portion 2c concaved along the longitudinal axis of the plate section 2 for fixing a gimbal 3 (31) made by machine a thin plate. The gimbal 3 substantially has a configuration that four branches 3c to 3f radially extend from a junction point so that two branches 3e and 3f of the four branches 3c to 3f are fixedly connected to a frame portion 3a and adhering portions 3b are formed at the end portions of the remaining two branches 3c and 3d. The four branches 3c to 3f are respectively tapered toward the junction point so as to form neck portions at the vicinity of the junction point. The adhering portions 3b are adhered to a surface opposite to the floating surface of a magnetic head 4 (41) so as to step over a groove portion 4i formed in the opposite surface.

In operation, when the magnetic head 4 moves in directions perpendicular to the disc 51 surface, the flexible member 21 is bent at the vicinity of the hole 2d portion. Further, the branches 3c to 3f (neck portions) of the gimbal 3 are twisted when the magnetic head 4 takes a pitching or rolling action. As a result, the magnetic head 4 follows the vibration of the surface of the disc 51 in the state that floats above the disc 51 surface.

Here, the reason why this embodiment does not take a similar structure to the above-described conventional apparatus where the projection 3g of the gimbal 3 is arranged to be brought into contact with the flexible member 2 so that the magnetic head 4 takes pitching and rolling actions with respect to the contact point is as follows. That is, in this embodiment, since the load of the flexible member 21 is set so as to be applied in the direction that the magnetic head 4 is separated from the disc 51 surface, if taking the similar structure, the projection 3g is separated from the flexible member 2 and the magnetic head 4 is supported by the plate section 2 of the flexible member 21. This state makes difficult the pitching and rolling actions of the magnetic head 4, thereby making it difficult that the magnetic head 4 follows the surface vibration of the disc 51 and, in addition, making great the vibration of the magnetic head 4.

Returning back to FIG. 9, the magnetic heads 41, 42 are provided for the disc 51, the magnetic heads 43, 44 are provided for the disc 52 and the magnetic heads 45, 46 are provided for the disc 53. Numerals 61 to 64 designate load pins, the load pin 61 being disposed at the upper side of the disc 51, the load pin 62 being disposed between the flexible members 22 and 23, the load pin 63 being disposed between the flexible members 24 and 25 and the load pin 64 being disposed at the lower side of the disc 53 in the illustration. The load pins 61 to 64 are at one ends connected through a member to each other and at the other ends equipped with point portions which allow the point contacts with the flexible members 21 to 26.

Figure 11:
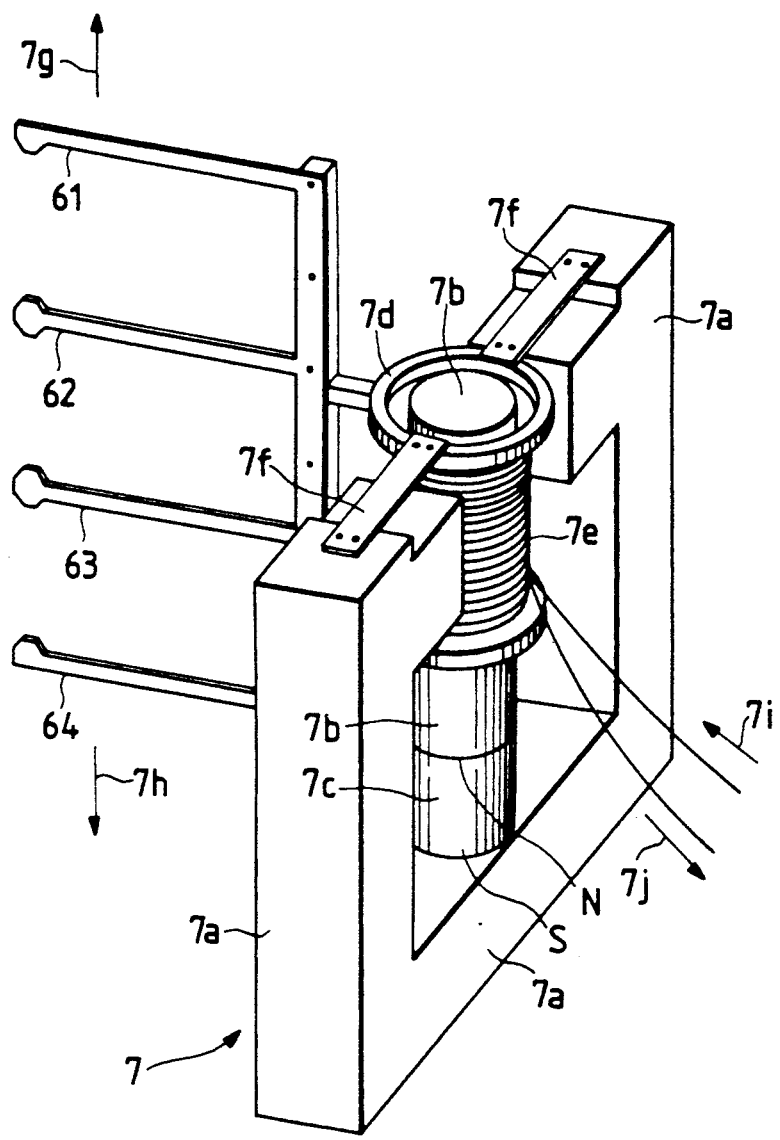
FIG. 11 is a perspective view showing an arrangement of a driver for driving load pins which is used in the embodiment of this invention.

FIG. 11 shows a driver for driving the load pins 61 to 64. In FIG. 11, 7a represents an external yoke member and 7b designates a center yoke member. The external yoke member 7a and the center yoke member 7b are fixedly connected through a magneto 7c to each other. The N-pole and S-pole of the magneto 7c are disposed along the moving directions of the load pins 61 to 64. Further, 7d depicts a bobbin around which a conductive wire 7e is wound, the bobbin 7d being disposed so as to surround the center yoke member 7b and supported by supporting members 7f, made from leaf springs, so as to be movable in the moving directions 7g and 7h of the load pins 61 to 64.

In operation, a magnetic flux generates by the magneto 7c at a portion which is interposed between the external yoke member 7a and the center yoke member 7b and which encases the bobbin 7d. When the magnetic flux is taken as Bf and when the effective length of the conductive wire 7e which is substantially in the vertical interlinking relation to the magnetic flux Bf is taken to be 1, in the case of supplying a current Id to the conductive wire 7e, a force of $F = Bf \times Id \times 1$ generates in the bobbin 7d according to the Fleming's left-hand rule. Here, since the bobbin 7d is supported by the supporting members 7f which act as leaf springs, the bobbin 7d displaces by an amount corresponding to the force generated in the bobbin 7d in accordance with the Hooke's law. When changing the direction of the current, the direction of the force to be generated in the bobbin 7d changes so as to change the direction of the displacement thereof. Further, the force to be generated in the bobbin 7d depends upon the value of the current to be supplied to the conductive wire 7e so that the force becomes greater as the current value becomes greater, thereby more increasing the displacing amount of the load pins 61 to 64. Since the movement of the load pins 61 to 64 is substantially proportional to the current to be supplied to the conductive wire 7e, it is possible to change the moving speed of the load pins 61 to 64 by changing the variation per time of the current to be supplied thereto.

Secondly, a loading operation of the magnetic head will be described hereinbelow with reference to FIGS. 9 and 11. In the case that a current is supplied to the conductive wire 7e in the direction indicated by an arrow 7i when the discs 51 to 53 reach a predetermined rotational speed, the load pins 61 to 64 moves in the direction indicated by the arrow 7g. At this time, the flexible members 22, 24 and 26 are moved by the load pins 62, 63 and 64 so as to be closer to the discs 51, 52 and 53, and the magnetic heads 42, 44 and 46 are also moved to be closer to the discs 51 to 53 and then float above the discs 51 to 53, respectively. On the other hand, in the case that the direction of the current to be supplied to the conductive wire 7e takes the direction indicated by an arrow 7j, the load pins 61 to 64 move in the direction indicated by the arrow 7h whereby the flexible members 21, 23 and 25 are displaceed by the load pins 61, 62 and 63 so as to be closer to the discs 51 to 53 and the magnetic heads 41, 43 and 45 take floating states with respect to the discs 51 to 53, respectively.

As described above, with the direction of the current to be supplied to the conductive wire 7e being change, all the magnetic heads 41 to 46 can float above the discs 51 to 53. On the other hand, the unloading of the magnetic heads 41 to 46 can be achieved only by reducing the rotational speed of the discs 51 to 53. That is, since the flexible members 21 to 26 are arranged such that the load is applied in the direction that they are separated from the discs 51 to 53, when the balance between the positive and negative pressures generated with respect to the magnetic heads 41 to 46 and the loads of the flexible members 21 to 26 is lost, the magnetic heads 41 to 46 are separated from the surfaces of the discs 51 to 53, then resulting in returning to the unloading positions.

Here, although in this embodiment the directions of the movements of the load pins 61 to 64 are respectively changed by changing the direction of the current to be supplied to the conductive wire 7e, it is appropriate that two conductive wires are wound around the bobbin 7d in directions opposite to each other and current is alternately supplied to the two conductive wires in the same direction.

Figure 12:
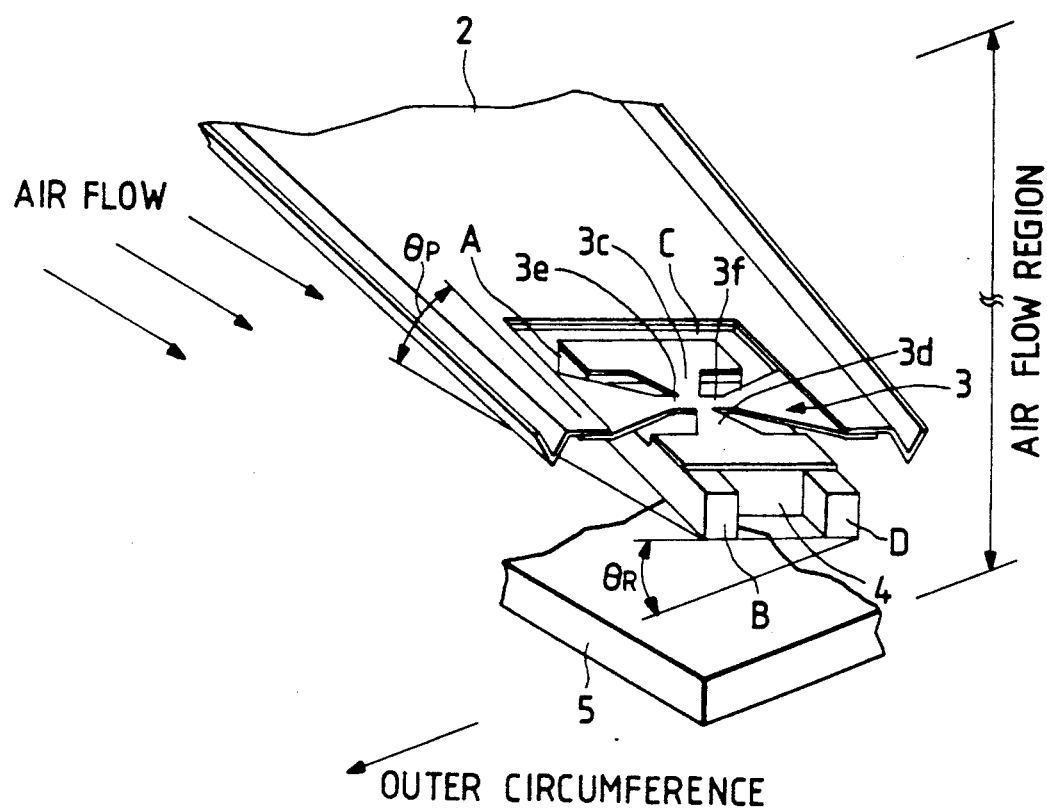
FIG. 12 is an illustration for describing a loading state of a magnetic head.

A description will be made hereinbelow in terms of a loading method of the magnetic heads in the magnetic disc apparatus as arranged above. FIG. 12 shows the state of the magnetic head placed within the air flow region due to the rotation of the disc. In FIG. 12, the disc 5 (51, 52 or 53) rotates in the direction from the air-inlet portions A, C to the air-outlet portions B, D of the magnetic head 4 and air also flows in the same direction. The air-inlet portion C and air-outlet portion D are positioned at the inner side with respect to the center of the disc 5 as compared with the air-inlet portion A and the air-outlet portion B. The air-inlet portions A and C will be referred hereinafter to as outer and inner air-inlet portions, respectively, and the air-outlet portions B and D will be referred hereinafter to as outer and inner air-outlet portions, respectively.

Here, the inclinations of the magnetic head 4 with respect to the disc 5 within the air flow region are defined as follows. That is, the angle made between the line extending from the outer air-inlet portion A to the outer air-outlet portion B and the surface of the disc 5 (the inclination of the line AB) is taken to be $\theta_P$ and the angle $\theta_P$ is positive when the outer air-inlet portion A is more separated from the disc 5 as compared with the outer air-outlet portion B. Further, the angle made between the line from the outer air-outlet portion B to the inner air-outlet portion D and the surface of the disc 5 (the inclination of line BD) is taken to be $\theta_R$ and the angle $\theta_R$ is positive when the outer air-outlet portion B is more separated from the disc 5 as compared with the inner air-outlet portion D. The angle $\theta_P$ will be referred hereinafter to as a pitching angle and the angle $\theta_R$ will be referred hereinafter to as a rolling angle.

In loading, it has been found that the magnetic head 4 does not come into contact with the disc 5 at all when the magnetic head 4 approaches the disc 5 at a speed below a predetermined speed with the pitching angle $\theta_P$ and the rolling angle $\theta_P$ of the magnetic head 4 being kept to be below predetermined angles within the air flow region. Further, it has been found that the positive pressure to be generated to the magnetic head 4 within the air flow region generates in accordance with the pitching angle $\theta_P$ and rolling angle $\theta_R$ of the magnetic head 4 and the magnetic head 4 floats above the disc 5 only under the condition that a load greater than the positive pressure generated to the magnetic head 4 is applied immediately before the generation of the negative pressure.

Figure 13:
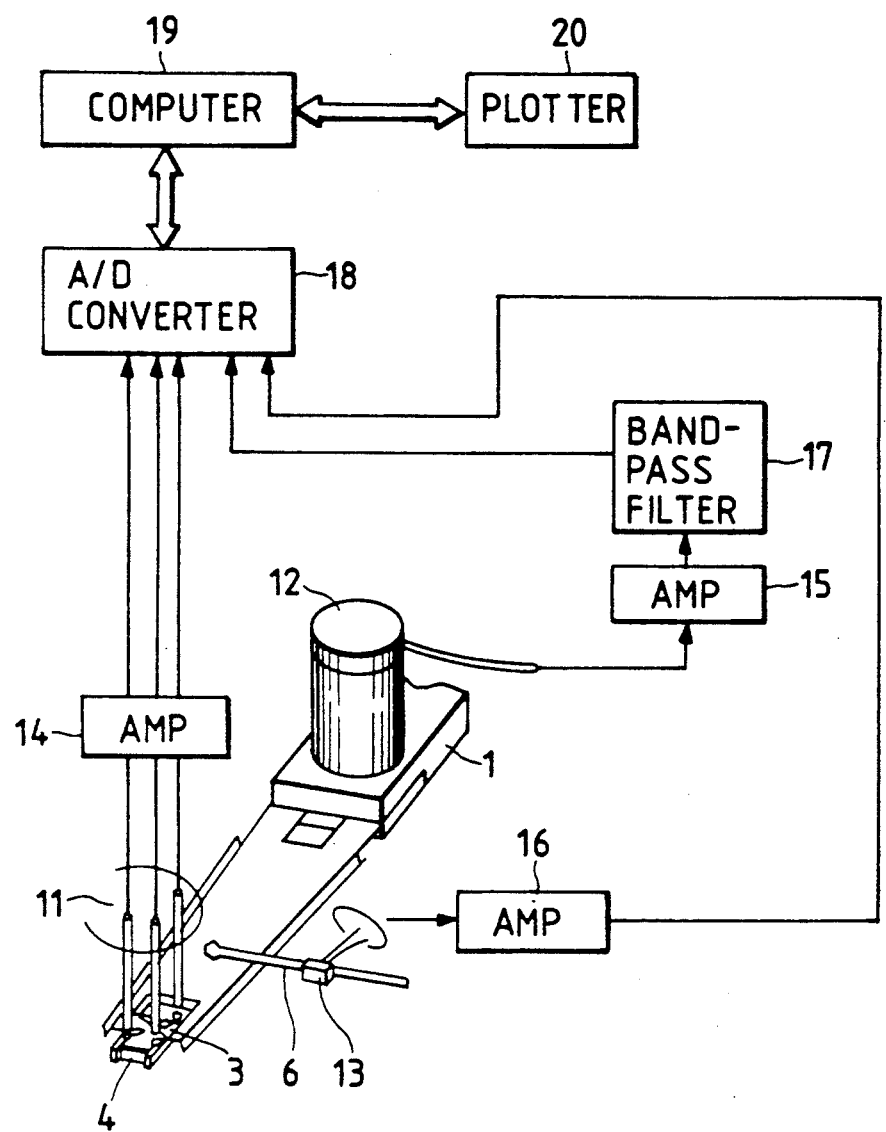
FIG. 13 shows a test apparatus for measuring the relation between the inclination of a magnetic head, a load applied to the magnetic head and the contacting state of the magnetic head with a disc.

FIG. 13 shows an arrangement of a test apparatus for confirming the aforementioned phenomena. In FIG. 13, numerals 6 designates a load pin (one of 61 to 64) which is driven by the driver as illustrated in FIG. 11. The test apparatus is equipped with a non-contact type displacement sensor 11 utilizing the fact that the reflection light quantity varies in response to variation of the gap between a probe and an object. The displacement sensor 11 detects the displacements of 3 points of the gimbal 3 and the air-inlet portions and air-outlet portions of the magnetic head 4 so as to sense the pitching angle $\theta_P$ and rolling angle $\theta_R$ of the magnetic head 4. The output signal of the displacement sensor 11 is led to an amplifier 14 so as to be amplified and then supplied through an analog-to-digital converter 18 to a computer 19. The test apparatus is further provided with a contact sensor 12 attached to the arm 1 for detecting the natural vibration of the magnetic head 4 occurring when the magnetic head 4 comes into contact with the disc 5 and for outputting a signal indicative of the detected natural vibration thereof. The output signal of the contact sensor 12 is led to an amplifier 5 to be amplified and then supplied to a band-pass filter 17 which derives only the natural vibration signal from the amplified contact sensor output signal. The output signal of the band-pass filter 17 is supplied through the analog-to-digital converter 18 to the computer 19. Also included is a load sensor 13 fixedly secured to the load pin 6 for detecting a load generated at the top portion of the load pin 6 by utilizing the fact that the load pin 6 is distorted when the load is applied to the flexible member 2 through the load pin 6. Here, the relation between the load applied to the top portion of the load pin 6 and the output voltage of the load sensor 13 is in advance measured and stored in a memory of the computer 19. The output signal of the load sensor 13 is supplied through an amplifier 16 and the analog-to-digital converter 18 to the computer 19. The computer 19 processes the output signals of the displacement sensor 11, the contact sensor 12 and the load sensor 13 and outputs the process result to a plotter 20.

Figure 14A:
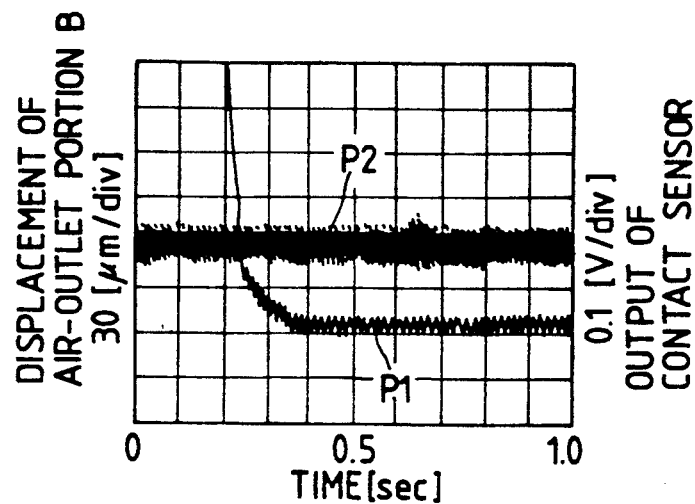
FIGS. 14A to 14C show the result obtained by the FIG. 13 test apparatus.
Figure 14B:
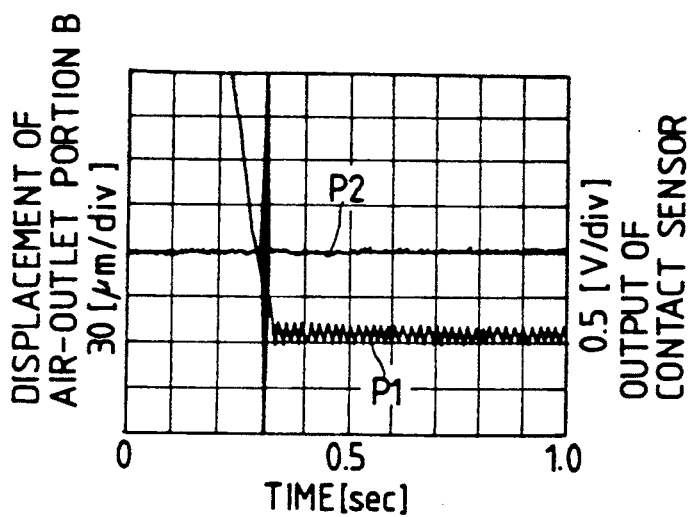
Figure 14C:
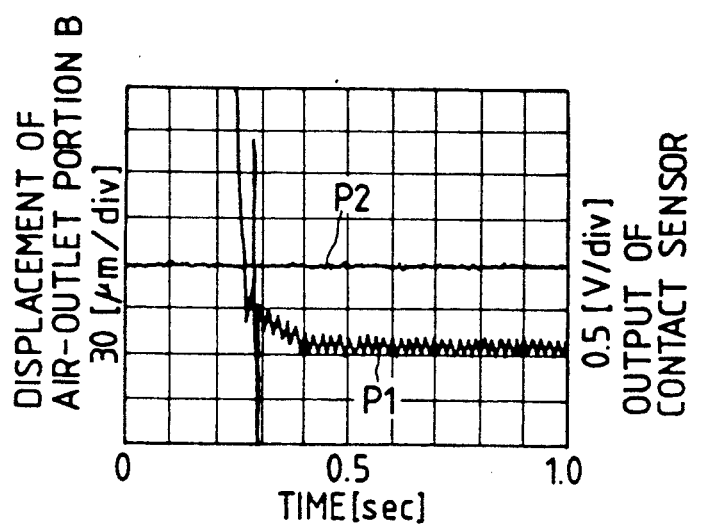

For testing, the speed that the magnetic head 4 approaches the disc 5 is arranged to be extremely reduced whereby it is possible to disregard the approaching speed and the contact state between the magnetic head 4 and the disc 5 is measured with the pitching angle $\theta_P$ and the rolling angle $\theta_R$ being used as parameters. Here, the rotational speed of the disc 5 is 3600 rpm and the measurement position is at the vicinity of the outermost portion of the disc 5. FIGS. 14A to 14C show the test results, i.e., the displacements of the magnetic head 4 and the output of the contact sensor 12 in accordance with the passage of time when loading. In FIGS. 14A to 14C, P1 shows the displacement of the outer air-outlet portion B of the magnetic head 4 in units of 30 [μm] and P2 shows the outputs of the contact sensor 12 in units of 0.1 [V] and 0.5 [V]. The pitching angle $\theta_P$ and the rolling angle $\theta_R$ of the magnetic head 4 taken for obtaining the test results in FIGS. 14A to 14C are different from each other as shown in the following table and are the maximum values within the air flow region.

|  | pitching angle $\theta_P$ [o] | rolling angle $\theta_R$ [o] |
| --- | --- | --- |
| FIG. 14A | +1.3 | −0.6 |
| FIG. 14B | −0.7 | 0.0 |
| FIG. 14C | +1.9 | −1.4 |

In FIG. 14A, the magnetic head 4 floats above the disc 5 when the time is elapsed by 0.35 [sec]. After the floating, the air-outlet portion B of the magnetic head 4 periodically displaces as indicated by P1. This is due to vibration of the surface of the disc 5. The output P2 of the contact sensor 12 does not varies before and after the floating. This output value corresponds to the noise level and represents the fact that the magnetic head 4 floats without coming into contact with the disc 5. In FIG. 14B, the magnetic head 4 floats when the time is 0.3 [sec]. After the floating, the air-outlet portion B displaces as in the case illustrated in FIG. 14A. The output P2 of the contact sensor 12 varies in a greatly pulsative form at the time of the floating of the magnetic head 4. This means that the magnetic head 4 comes into contact with the disc 5 when floating. Further, in FIG. 14C, the magnetic head 4 floats when the time is 0.4 [sec]. After the floating, the air-outlet portion B displaces as in the case illustrates in FIG. 14A or 14B. The output P2 of the contact sensor 12 does not appear at the time of the floating but appears in a pulsative form about 0.1 [sec] before the floating. This means that the magnetic head 4 comes into contact with the disc 5 before the floating.

Secondly, a description will be made hereinbelow in terms of the reason why the magnetic head 4 comes into contact with the disc 5 as illustrated in FIGS. 14B and 14C. In FIG. 14B, the pitching angle $\theta_P$ of the magnetic head 4 is negative and the magnetic head 4 approaches the disc 5 from the air-inlet side. As will hereinafter be described in detail, in the case that the magnetic head 4 approaches the disc 5 from the air-inlet side, the positive pressure scarcely generates. In the case that the negative pressure generates and the magnetic head 4 rapidly approaches the disc 5, it is considered as the magnetic head 4 results in coming into contact with the disc 5 by impetus because of no generation of the positive pressure which allows the suppression of the speed of the magnetic head 4. On the other hand, in FIG. 14C, the pitching angle $\theta_P$ is positive and the air-outlet side of the magnetic head 4 first approaches the disc. As compared with the case illustrated in FIG. 14A, both the pitching angle and rolling angle are greater. In this case, the positive pressure generates with respect to the magnetic head 4. However, it is considered as the magnetic head 4 results in coming into contact with the disc 5 because the inclination of the magnetic head 4 is great so that difficulty is encountered to sufficiently parallel the magnetic head 4 with respect to the disc 5 by the positive pressure. From the above results, we can consider as there are the range of the pitching angle $\theta_P$ and the range of the rolling angle $\theta_R$ where the magnetic head 4 does not come into contact with the disc 5.

Figure 15:
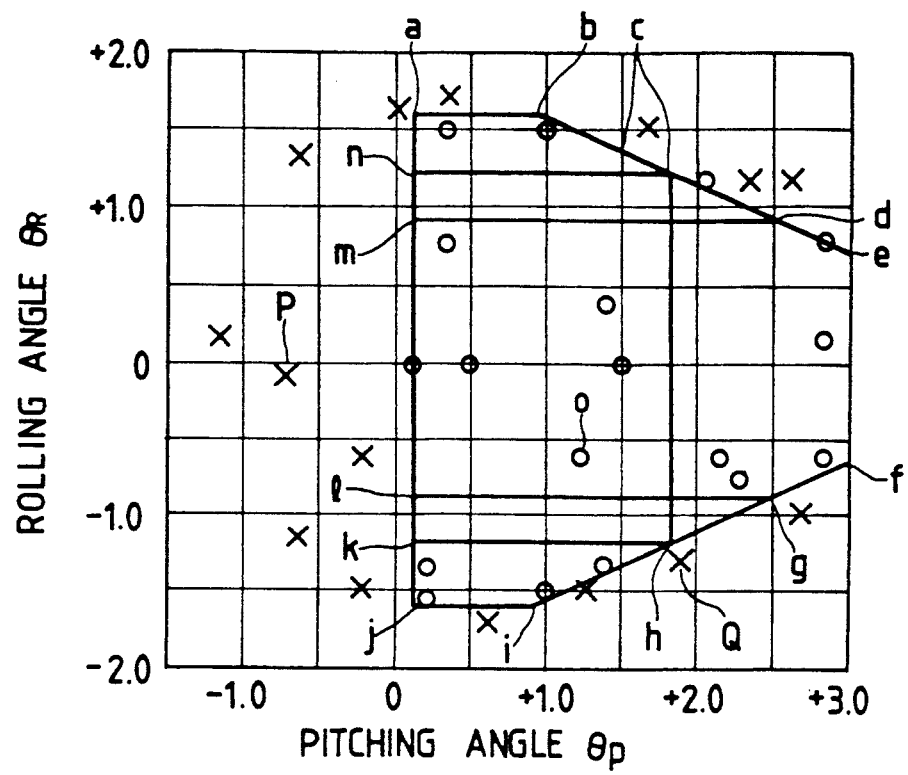
FIG. 15 is a graphic illustration for describing the relation between the pitching and rolling angles of a magnetic head and the contact of the magnetic head with a disc.

FIG. 15 shows the contact states of the magnetic head with the disc 5 which are measured by finely setting the pitching angle $\theta_P$ and the rolling angle $\theta_R$. In FIG. 15, marks o and x designate the pitching angle $\theta_P$ and rolling angle $\theta_R$ for the measurement, and the mark o represents the pitching angle $\theta_P$ and rolling angle $\theta_R$ in the case that the magnetic head 4 does not contact with the disc 5 and the mark x denotes the pitching angle $\theta_P$ and rolling angle $\theta_R$ in the case that the magnetic head 4 contacts with the disc 5. Here, FIG. 14A corresponds to the state indicated by character O, FIG. 14B corresponds to the state indicated by character P, and FIG. 14C corresponds to the state indicated by character Q.

It has been found from FIG. 14 that the magnetic head 4 does not contact with the disc 5 when the magnetic head 4 is loaded with the pitching angle $\theta_P$ and rolling angle $\theta_R$ surrounded by the line connecting points a, b, e, f, i, j and a. Further, it has been found that, when the pitching angle $\theta_P$ becomes great as in the case of the line between the points b and e or the line between the points f and i, the range of the rolling angle $\theta_P$ where the magnetic head 4 does not contact with the disc 5 narrows gradually. Loading the magnetic head 4 with the pitching angle $\theta_P$ and rolling angle $\theta_R$ surrounded by the line connecting the points a, b, e, f, i, j and a can be achieved by controlling the heights of the arm 1 and disc 5 and others.

Here, since in practice difficulty is encountered to accurately control the pitching angle $\theta_P$ and rolling angle $\theta_R$ so as to be in the range surrounded by the line connecting the points a, b, e, f, i, j and a, in this embodiment the pitching angle $\theta_P$ and rolling angle $\theta_R$ are set to be in the range surrounded by the line connecting the points n, c, h, k and n, that is, they are determined as follows.

$$+0.1° \leq \theta_P \leq +1.8°$$

$$-1.2° \leq \theta_R \leq +1.2°$$

It is also appropriate that the pitching angle $\theta_P$ and rolling angle $\theta_R$ are set to be in the range surrounded by the line connecting the points m, d, g, l and m.

Further, in FIG. 15, in the region that the magnetic head 4 comes into contact with the disc 5 in the case of the pitching angle $\theta_P \geq 0.1°$, it is considered as the magnetic head 4 results in contacting with the disc 5 because the magnetic head 4 cannot be paralleled sufficiently to the disc 5 irrespective of the generation of the positive pressure. That is, it is considered as there is a force which impedes that the magnetic head 4 becomes parallel to the disc 5. This phenomenon will be described hereinbelow with reference to FIG. 12.

In FIG. 12, the magnetic head 4 is fixedly secured through the gimbal 3 to the flexible member 2 and the approaching of the magnetic head 4 to the disc 5 can be achieved with the flexible member 2 being bent from the vicinity of its arm-fixed portion. Further, for paralleling the magnetic head 4 with respect to the disc 5, the branches (neck portions) 3c to 3f of the gimbal 3 are required to be twisted. The torsional rigidity of each of these branches 3c to 3f thereof acts as the force to impede the paralleling of the magnetic head 4 with respect to the disc 5. Thus, if possible to reduce the torsional rigidity of each of the branches 3c to 3f of the gimbal 3, the angular range that the magnetic head 4 does not comes into contact with the disc 5, i.e., the region surrounded by the lines connecting the points a, b, e, f, i, j, and a, can further be widened. Actually, according to the test result made in the case that the thickness of the gimbal 3 is slightly reduced so as to reduce the torsional rigidities of the branches 3c to 3f, the range of the rolling angle $\theta R$ is enlarged under the pitching angle $\theta_P \geq 0.1°$. Moreover, according to the result obtained in the case that the rotational speed of the disc 5 is set to 5400 rpm and the same test is effected with respect to the same position of the disc 5, the ranges of the rolling angle and pitching angle that the magnetic head 4 does not come into contact with the disc 5 are widened. That is, when the introduction speed into the magnetic head 4 becomes higher, the non-contacted angular range can be more widened.

Here, a description will be made in terms of the speed of bringing the magnetic head 4 close to the disc 5 (which will be referred hereinafter to as loading speed). The loading speed depends on the displacing speed of the load pin 6 which in turn depends upon the varaition-per-time of the current flowing through the conductive wire 7e in FIG. 11. According to the test made by the FIG. 13 test apparatus, in the case of $+0.1° \leq \theta_P \leq +1.8°$ and $-1.2° \leq \theta_R \leq +1.2°$, when the loading speed is below 100 [mm/sec], it has been confirmed that the magnetic head 4 does not come into contact with the disc 5. The reason why the magnetic head 5 does not contact therewith will be described hereinbelow with reference to FIG. 16.

Figure 16:
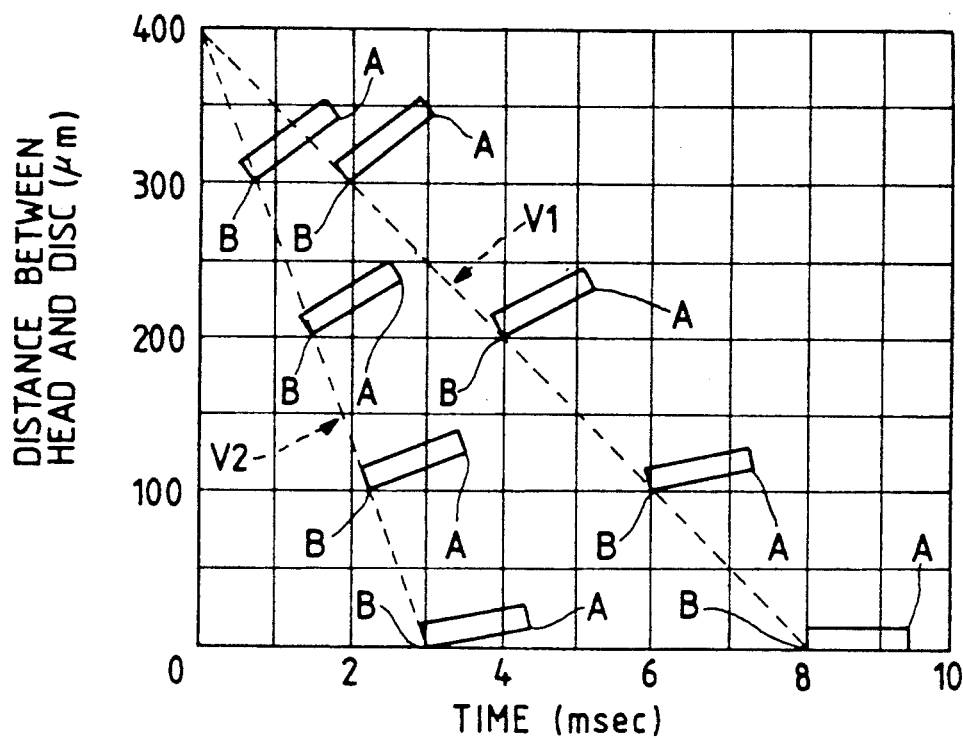
FIG. 16 is a graphic illustration for describing the relation between the loading speed of a magnetic head and the contact of the magnetic head with a disc.

In FIG. 16, the horizontal axis represents the time and the vertical axis represents the distance between the magnetic head 4 and the disc 5, and the characters A and B designate the air-inlet portion and air-outlet portion of the magnetic head 4 and 0 in the vertical axis corresponding to the surface of the disc 5. Further, the reference V1 denotes the locus of the air-outlet portion B of the magnetic head 4 in the case that the loading speed is below 100 [mm/sec] and the reference V2 depicts the locus of the air-outlet portion B thereof in the case that the loading speed is above 100 [mm/sec]. As indicated by V1, when the loading speed is below 100 [mm/sec], the difference in position between the air-inlet portion A and air-outlet portion B is reduced in accordance with the passage of time and the magnetic head 4 finally becomes substantially parallel to the disc 5 surface when the magnetic head 4 is drawn to the disc 5 due to the generation of the negative pressure. On the other hand, as indicated by V2, in the case that the loading speed is above 100 [mm/sec], the magnetic head 4 is still inclined even when the magnetic head 4 reaches the disc 5, whereby the air-outlet portion B comes into contact with the disc 5. Although the positive pressure generated with respect to the magnetic head 4 acts as a force to parallel the magnetic head 4 to the disc 5, in the case that the magnetic head 4 approaches the disc 5 at a speed higher than the speed corresponding to the time required for the magnetic head 4 to be paralleled, the magnetic head 4 comes into contact with the disc 5. Here, although in FIG. 16 the magnetic head 4 is brought close to the disc 5 at a constant speed, it is also effective that the magnetic head 4 approaches the disc 5 at a high speed (for example, above 100 [mm/sec]) when it is in a region where the positive pressure does not occur, and approaches the disc 5 at a speed below 100 [mm/sec] in the air-flow region. Further, for preventing the contact of the magnetic head 4 with the disc 5 when the loading speed is above 100 [mm/sec], the ranges of the rolling and pitching angles are required to be more narrowed.

Furthermore, a description will be made hereinbelow with reference to FIG. 17 in accordance with a test in terms of the positive pressure of the magnetic head 4 in the air flow region. This test is taken by using the test apparatus as illustrated in FIG. 13 and the load applied to the top portion of the load pin 6 is measure by the load sensor 13 attached to the load pin 6. Here, in order for obtaining only the positive pressure generated to the magnetic head 4, there is measured the difference between the load generated when the disc 5 stops and the load generated when the disc 5 rotates. The positive pressure varies in accordance with the rotational speed of the disc 5 and the loading position (loading radius) of the magnetic head 4, and hence it becomes greater as the loading position becomes closer to the outer circumference of the disc 5. Thus, the test is taken under the conditions that the disc 5 speed is 360 [rpm] and the loading position is the vicinity of the outermost position of the disc 5 having a diameter of 3.5 inches.

Figure 17:
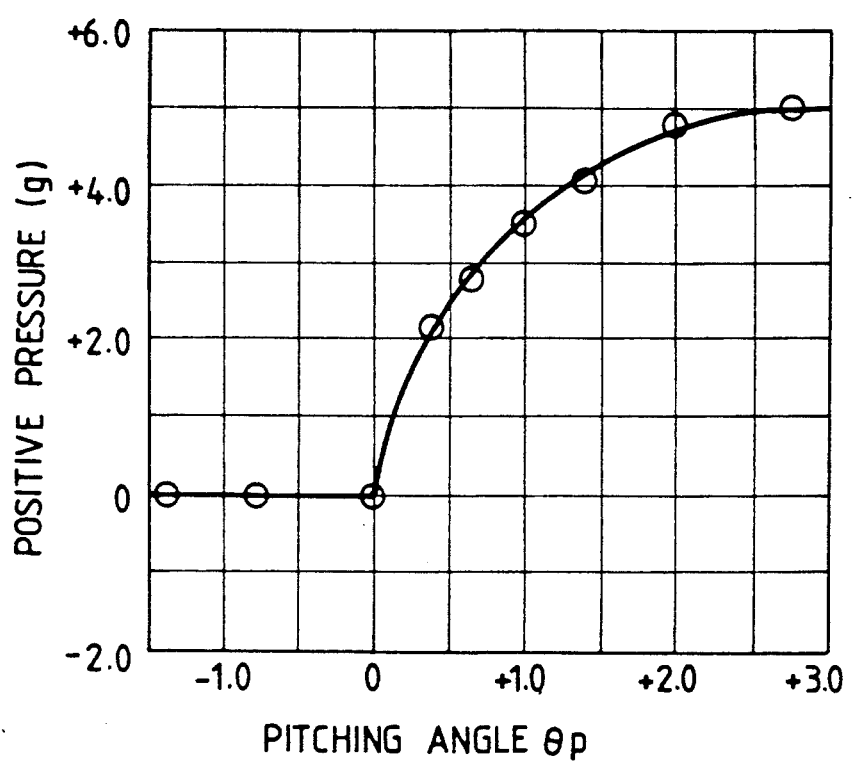
FIG. 17 is a graphic illustration for describing the relation between the positive pressure to be generated with respect to a magnetic head and the pitching angle of the magnetic head.

In FIG. 17, the horizontal axis represents the pitching angle $\theta_P$ of the magnetic head 4 and the vertical axis represents the positive pressure $W_P$. Here, the rolling angle $\theta_R$ is substantially set to 0. As clear from the FIG. 17 test result, the positive pressure $W_P$ scarcely occurs when the pitching angle $\theta_P$ is about 0 or negative, and the positive pressure to be generated with respect to the magnetic head 4 becomes higher as the pitching angle $\theta_P$ is positive and becomes greater. In addition, when the rolling angle $\theta_R$ is changed under the condition that the pitching angle $\theta_P$ is constant, as the rolling angle $\theta_P$ becomes closer to 0, the positive pressure $W_P$ becomes greater. Moreover, since the positive pressure WP functions in the direction that prevents the magnetic head 4 from being close to the disc 5, in order for the magnetic head 4 floating above the disc 5, a load greater than the positive pressure generated is required to be applied to the magnetic head 4. If smaller than the positive pressure, the magnetic head 4 cannot reach the negative-pressure generating position thus not allowing the floating of the magnetic head 4 above the disc 5.

Figure 18A:
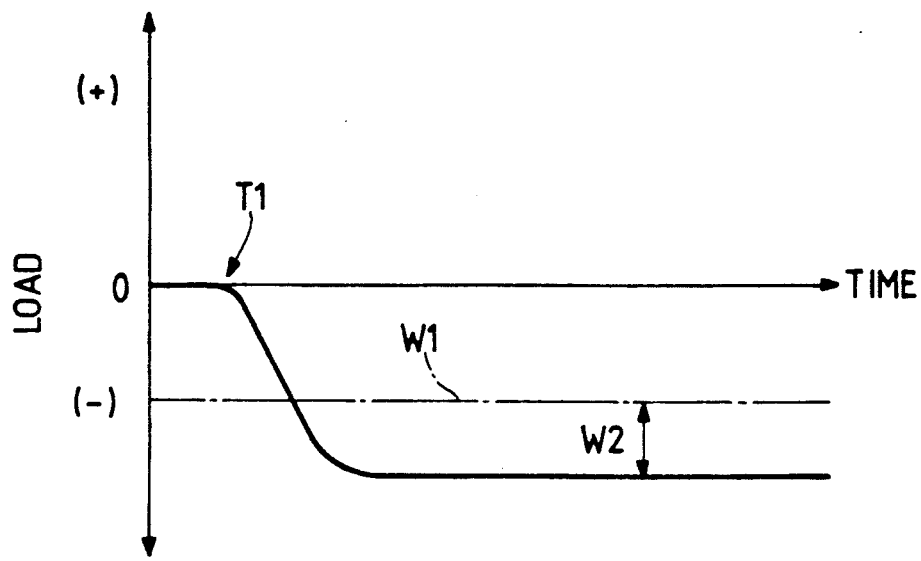
FIGS. 18A and 18B show the variations of the load to be applied to a magnetic head at the time of the loading and floating of the magnetic head.
Figure 18B:
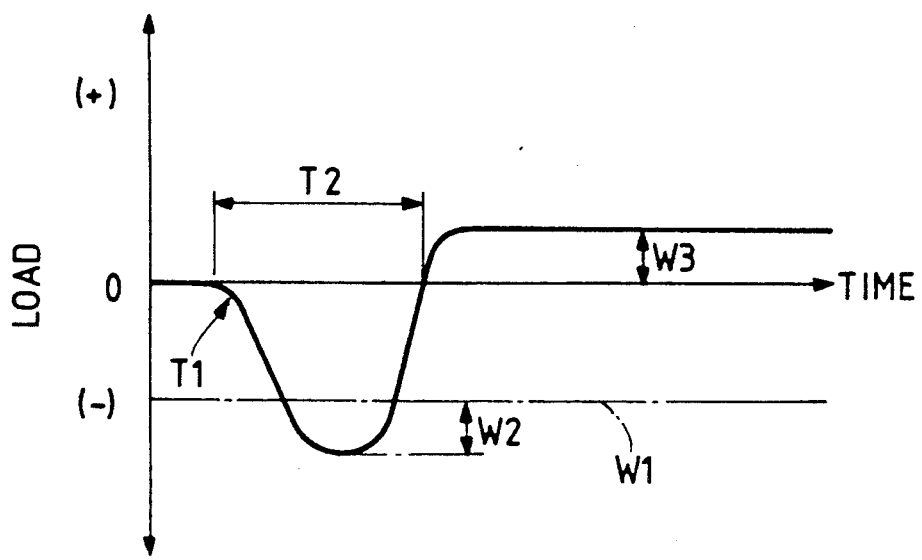

Furthermore, a description will be made hereinbelow in terms of the load to be applied to the magnetic head 4. FIGS. 18A and 18B show the variations of the loads at the time of the loading and after the floating, FIG. 18A showing the case that the loading is performed according to the conventional technique and FIG. 18B illustrating the case that the loading is effected by this invention. In FIGS. 18A and 18B, the horizontal axis represents the time and the vertical axis designates the load applied to the magnetic head 4, and (+) denotes that the force is applied in the direction that the magnetic head 4 is away from the disc 5 and (−) depicts that the force is applied in the direction that the magnetic head 4 is brought close thereto, and further W1 indicates the load value for the floating and the positive pressure generated with respect to the magnetic head 4.

According to the conventional technique, as illustrated in FIG. 18A, the loading operation is started from the time T1 and the load gradually increases with the passage of time in the direction that the magnetic head 4 approaches the disc 5 so that the magnetic head 4 floatable above the disc 5 when exceeding the load value W1. Thereafter, the load further increases in the same direction and, after the load reaches W1+W2, the magnetic head 4 floats in the state that the load of W1+W2 is kept as it is. Although in principal the magnetic head 4 can float when the load W1 is applied thereto, in the magnetic disc apparatus including a plurality of magnetic heads, since there is a difference between the pitching angles $\theta P$ and the rolling angles $\theta R$, the positive pressures to be generated for the magnetic heads are different from each other. In addition, according to the conventional technique, a load is arranged to be applied to the magnetic head 4 in the approaching direction due to the restoring force of the flexible member 2, and the restoring force can gradually be reduced to make small the load value when repeatedly performing the loading and unloading operations. Thus, in order for surely floating the magnetic head 4, the load to be applied to the magnetic head 4 is set with a margin of W2. However, if using such as loading method, a force is always applied to the magnetic head 4 in the approaching direction, and the load W2 which is an excessive load is additionally applied thereto during the floating. When vibration occurs in the arm 1 and the disc 5, this case can raise the possibility that the magnetic head 4 comes into contact with the disc 5. In addition, in case that the rotation of the disc 5 stops, the magnetic head 4 can slide on the disc 5 so as to break the data written on the disc 5. Moreover, the magnetic head 4 is absorbed onto the disc 5 so as to impede the rotation of the disc 5. Accordingly, according to the conventional method, it is difficult that the margin W2 is set to a great value.

On the other hand, according to this invention, as illustrated in FIG. 18B, when the loading operation is started from the time T1, the load in the head-approaching direction gradually increases with the passage of time, and when exceeding the load value W1, the magnetic head 4 floats above the disc 5 and the load is applied to the magnetic head 4 until reaching W1+W2. That is, after the load of W1+W2 is once applied thereto, the load gradually decreases and, when the time period T2 is elapsed from the start of the loading operation, the magnetic head 4 is responsive to a load applied in the separating direction. Further, when the load reaches W3, the magnetic head 4 floats in the state that the load W3 is kept as it is. This load value W3 is useful when the rotational speed of the disc 5 is decreased and the magnetic head 4 is separated from the disc 5 (i.e., when unloading). Thus, according to this invention, it is possible to extremely reduce the time period in which the load W1+W2 is applied to the magnetic head 4 and further to shorten the time period in which the load is applied in the direction that the magnetic head 4 approaches the disc 5. In addition, the load value W2 can be decreased as compared with the conventional technique. Moreover, since the load is applied to the magnetic head 4 in the separating direction during the floating, even if the disc 5 stops to rotate, the magnetic head 4 can be separated from the disc 5 so as to prevent the data from being broken and prevent it from being absorbed to the disc 5.

Figure 19:
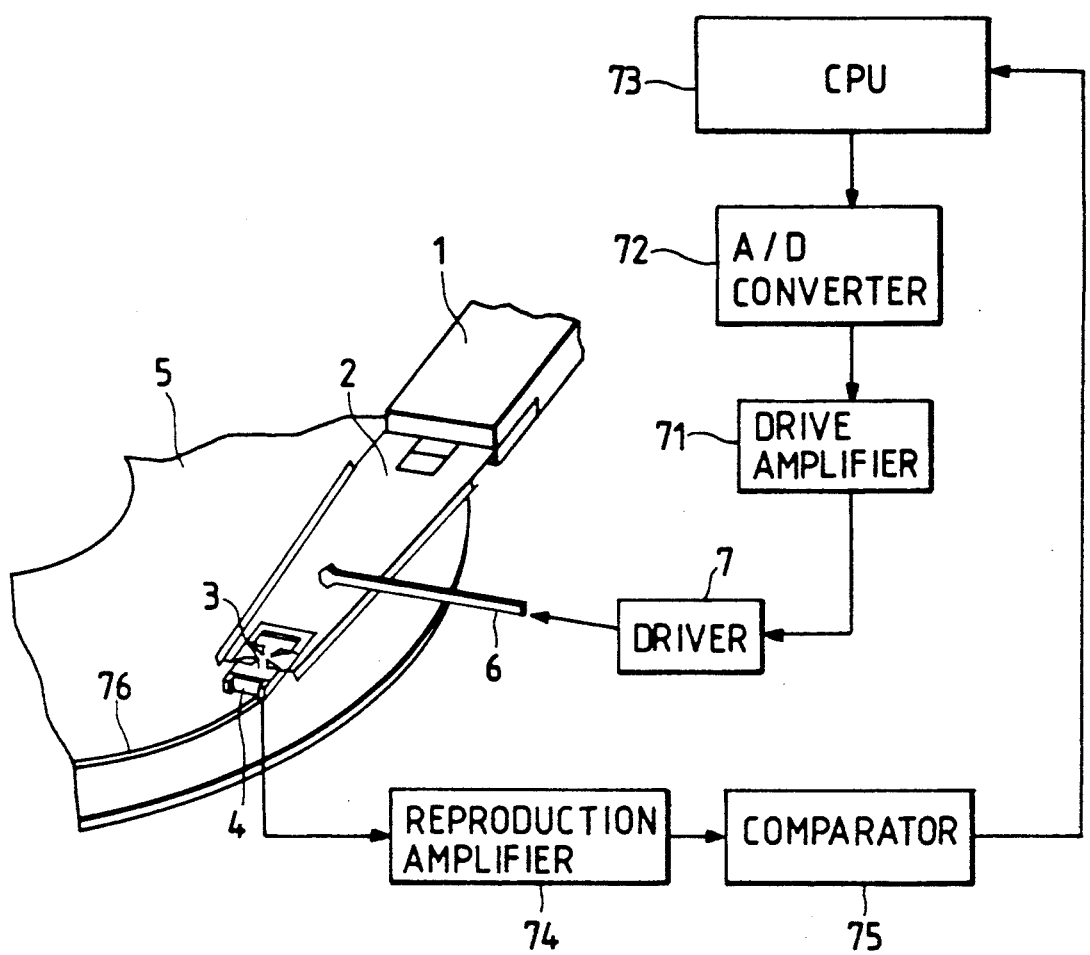
FIG. 19 shows an arrangement of a control circuit for the load pin driver illustrated in FIG. 11.

Still further, a description will be made hereinbelow with reference to FIG. 19 in terms of operation of the driver 7 illustrated in FIG. 11. FIG. 19 shows an arrangement for the operation of the driver 7. In FIG. 19, numeral 71 represents a drive amplifier for supplying a current to the driver 7, the drive amplifier 71 being coupled through a digital-to-analog converter 72 to a central processing unit (CPU) 73. The CPU 73 has a memory for in advance storing load-pin drive signal information (drive pattern and strength of the drive current) in digital form whereby for the loading of the magnetic head 4 the drive signal is supplied through the digital-to-analog converter 72 to the drive amplifier 71 which in turn drives the driver 7 in accordance with the supplied drive signal therefrom. That is, a current corresponding to the drive signal is supplied to the driver 7 whereby the load pin 6 displaces toward the disc 5 so as to float the magnetic head 4 above the disc 5. For driving the load pin 6, the change can freely be effected because the drive patterns and the strengths of the drive currents are prestored in the CPU 73. Since as described above the load to be generated at the load pin 6 is proportional to the strength of the current to be supplied to the driver 7 and the displacement speed of the load pin 6 depends upon the variation-per-time of the current to be supplied to the driver 7, it is possible to easily perform the control of the magnitude of the load to the magnetic head 4 and the loading speed of the magnetic head 4.

Further, a description will be made hereinbelow with reference to FIG. 19 in terms of a method of controlling the time that the load is applied to the magnetic head 4 in the direction of the disc 5 immediately after the floating of the magnetic head 4. In FIG. 19, numeral 76 represents an information signal (track) to be written and read out through the magnetic head 4 on and from the disc 5, 74 designates a reproduction amplifier for amplifying the information signal read out through the magnetic head 4, and 75 is a reproduced-signal comparator coupled to the reproduction amplifier 74 for outputting a signal when the level of the output signal of the reproduction amplifier 74 exceeds a predetermined level and supply it to the above-mentioned CPU 73. In the case that the magnetic head 4 is in the unloading state, the output of the reproduction amplifier is zero, and when the magnetic head 4 is brought close to the disc 5 in response to the drive signal from the CPU 73, the level of the output signal of the reproduction amplifier 74 gradually increases so as to become the maximum and constant immediately after the magnetic head 4 floats above the disc 5. Accordingly, if the level corresponding to the output of the reproduction amplifier 74 obtained when the magnetic head 4 floats above the disc 5 is set as the reference level to the comparator 75, the comparator 75 can be arranged so as to output the signal to the CPU 73 after a predetermined time period is elapsed from the time of the detection of the floating of the magnetic head 4. More specifically, data is in advance recorded at the loading region of the magentic disc 5 for the magnetic head 4. When the magnetic head 4 approaches the magnetic disc 5, the reproduction output of the magnetic head 4 gradually becomes greater to reach the maximum value at the steady floating state. If a value (threshold level) slightly smaller than this maximum value is set to the comparator 75, when the reproduction output exceeds the threshold level, the comparator 75 confirms that the magnetic head 4 reaches the floating state, and outputs a drive-stopping signal to the CPU 73 after a previously set time period is elapsed from the confirmation. In response to the output signal of the comparator 75, the CPU 73 stops to supply the drive signal to the driver 7 in order to restore the load pin 6 to the original position. With this arrangement, it is possible to control the time period that the load is applied to the magnetic head 4 in the approaching direction to the disc 5 immediately after the floating of the magnetic head 4. Further, it is possible to surely confirm that the magnetic head 4 floats above the disc 5, thereby eliminating the problem due to no floating.

According to this embodiment, only for the time period that the magnetic head 4 is in the loading state and for the predetermined time period immediately after the magnetic head 4 floats, the force is applied to the magnetic head 4 in the direction approaching the disc 5, and thereafter the force is applied thereto in the direction separating from the disc 5. Thus, it is possible to extremely reduce the possibility that the magnetic head 4 comes into contact with the disc 5, and further to prevent the data from being broken and damaged due to the stopping of the rotation of the disc 5.

Furthermore, in the disc apparatus according to this invention, one load pin 6 is provided for one or two flexible members 2, the driver 7 for driving the load pin 6 is arranged such that an external yoke member and a center yoke member are fixedly secured through the magneto to each other and a bobbin having a conductive wire is supported to surround the center yoke member and arranged to be movable, and the strength and variation of the current to be supplied to the conductive wire of the bobbin and the supplying time period of the current are arranged to be controlled for the operation of the driver 7. Thus, the size-reduction of the disc apparatus can be achieved and the generation of dust in the disc apparatus can be reduced due to reduction of the sliding parts.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A method of loading a negative pressure type magnetic head with respect to a magnetic recording medium which head is equipped with an air-inlet portion for introduction of air and an air-outlet portion for discharge of air which are disposed along a longitudinal axis of said head, comprising the step of causing said magnetic head being brought close to said magnetic recording medium to float above a surface of said magnetic recording medium and satisfy the following conditions when reaching a region of air flow occurring due to rotation of said magnetic recording medium:

$$+0.1° \leq \theta_P \leq +1.8°$$

$$-1.2° \leq \theta_R \leq +1.2°$$

$$VL \leq 100 [mm/sec]$$

where $\theta_P$ represents a pitching angle of said magnetic head which is an angle made between said longitudinal axis of said magnetic head and said surface of said magnetic recording medium, said pitching angle taking a positive (+) angle when said air-inlet portion is more separated from said surface of said magnetic recording medium as compared with said air-outlet portion, $\theta_R$ designates a rolling angle of said magnetic head which is an angle made between said surface of said magnetic recording medium and a traversal axis perpendicular to said longitudinal axis of said magnetic head, said rolling angle taking a positive (+) angle when a portion of said magnetic head which is on said traversal axis and far away from a center of said magnetic recording medium is more separated from said surface of said magnetic recording medium as compared with a portion thereof which is on said traversal axis and near the center of said magnetic recording medium; and VL denotes a speed of said magnetic head taken when being brought close to said magnetic recording medium.

2. A method of loading a negative pressure type magnetic head with respect to a magnetic recording medium which head is equipped with an air-inlet portion for introduction of air and an air-outlet portion for discharge of air which are disposed along a longitudinal axis of said head, comprising the step of causing said magnetic head being brought close to said magnetic recording medium to float above a surface of said magnetic recording medium so as to satisfy the following conditions due to rotation of said magnetic recording medium:

$$+0.15° \leq \theta_P \leq +1.5°$$

$$-0.6° \leq \theta_R \leq +0.6°$$

$$VL \leq 50 [mm/sec]$$

where $\theta_P$ represents a pitching angle of said magnetic head which is an angle made between said longitudinal axis of said magnetic head and said surface of said magnetic recording medium, said pitching angle taking a positive (+) angle when said air-inlet portion is more separated from said surface of said magnetic recording medium as compared with said air-outlet portion, $\theta_R$ designates a rolling angle of said magnetic head which is an angle made between said surface of said magnetic recording medium and a traversal axis perpendicular to said longitudinal axis of said magnetic head, said rolling angle taking a positive (+) angle when a portion of said magnetic head which is on said traversal axis and far away from a center of said magnetic recording medium is more separated from said surface of said magnetic recording medium as compared with a portion thereof which is on said traversal axis and near the center of said magnetic recording medium; and VL denotes a speed of said magnetic head taken when being brought close to said magnetic recording medium.

3. A magnetic disc apparatus comprising a magnetic disc, an arm movable in directions substantially parallel to a surface of said magnetic disc, a flexible member, one end portion of which is attached to said arm, a negative pressure type magnetic head attached through a gimbal to the other end portion of said flexible member, wherein said magnetic head is equipped with an air-inlet portion for introduction of air and an air-outlet portion for discharge of air which are disposed along a longitudinal axis of said head, and means for pressing said flexible member toward said magnetic disc to load said magnetic head above said magnetic disc and for causing said magnetic head being brought close to said magnetic disc to float above a surface of said magnetic disc so as to satisfy the following conditions when reading a region of air flow occurring due to rotation of said magnetic disc:

$$+0.1° \leq \theta_P \leq +1.8°$$

$$-1.2° \leq \theta_R \leq +1.2°$$

$$VL \leq 100 [mm/sec]$$

where $\theta_P$ represents a pitching angle of said magnetic head which is an angle made between said longitudinal axis of said magnetic head and said surface of said magnetic disc, and pitching angle taking a positive (+) angle when said air-inlet portion is more separated from said surface of said magnetic disc as compared with said air-outlet portion; $\theta_R$ designates a rolling angle of said magnetic head which is an angle made between said surface of said magnetic disc and a traversal axis perpendicular to said longitudinal axis of said magnetic head, said rolling angle taking a positive (+) angle when a portion of said magnetic head which is on said traversal axis and far away from a center of said magnetic disc is more separated from said surface of said magnetic disc as compared with a portion thereof which is on said traversal axis and near the center of said magnetic disc, and VL denotes a speed of said magnetic head taken when being brought close to said magnetic disc.

4. A magnetic disc apparatus as claimed in claim 3, wherein said pressing means comprises a load pin for pressing said flexible member and driving means for moving said load pin.

5. A magnetic disc apparatus as claimed in claim 4, wherein said load pin is arranged to extend in a direction substantially parallel to said surface of said magnetic disc, and said driving means moves said load pin in a direction substantially perpendicular to said surface of said magnetic disc.

6. A magnetic disc apparatus as claimed in claim 4, wherein said driving means operates in response to a current introduced thereinto and changes a speed of the movement of said load pin in accordance with a value of the introduced current.

7. A magnetic disc apparatus as claimed in claim 6, wherein said driving means stops to operate said load pin when a predetermined time period is elapsed immediately after said magnetic head floats above said magnetic disc.

8. A magnetic disc apparatus comprising a magnetic disc, an arm movable in directions substantially parallel to a surface of said magnetic disc, a flexible member, one end portion of which is attached to said arm, a negative pressure type magnetic head attached through a gimbal to the other end portion of said flexible member, wherein said magnetic head is equipped with an air-inlet portion for introduction of air and an air-outlet portion for discharge of air which are disposed along a longitudinal axis of said head, and means for pressing said flexible member toward said magnetic disc to load said magnetic head above said magnetic disc and for causing said magnetic head being brought close to said magnetic disc to float above a surface of said magnetic disc so as to satisfy the following conditions when reaching a region of air flow occurring due to rotation of said magnetic disc:

$$+0.15° \leq \theta_P \leq +1.5°$$

$$-0.6° \leq \theta_R \leq +0.6°$$

$$VL \leq 50 \text{ [mm/sec]}$$

where $\theta_P$ represents a pitching angle of said magnetic head which is an angle made between said longitudinal axis of said magnetic head and said surface of said magnetic disc, and pitching angle taking a positive (+) angle when said air-inlet portion is more separated from said surface of said magnetic disc as compared with said air-outlet portion; $\theta_R$ designates a rolling angle of said magnetic head which is an angle made between said surface of said magnetic disc and a traversal axis perpendicular to said longitudinal axis of said magnetic head, said rolling angle taking a positive (+) angle when a portion of said magnetic head which is on said traversal axis and far away from a center of said magnetic disc is more separated from said surface of said magnetic disc as compared with a portion thereof which is on said traversal axis and near the center of said magnetic disc, and VL denotes a speed of said magnetic head taken when being brought close to said magnetic disc.

9. A magnetic disc apparatus as claimed in claim 8, wherein said pressing means comprises a load pin for pressing said flexible member and driving means for moving said load pin.

10. A magnetic disc apparatus as claimed in claim 9, wherein said load pin is arranged to extend in a direction substantially parallel to said surface of said magnetic disc, and said driving means moves said load pin in a direction substantially perpendicular to said surface of said magnetic disc.

11. A magnetic disc apparatus as claimed in claim 9, wherein said driving means operates in response to a current introduced thereinto and changes a speed of the movement of said load pin in accordance with a value of the introduced current.

12. A magnetic disc apparatus as claimed in claim 11, wherein said driving means stops to operate said load pin when a predetermined time period is elapsed immediately after said magnetic head floats above said magnetic disc.

13. A method of loading a magnetic head with respect to a magnetic recording medium which head is equipped with an air-inlet portion for introduction of air and an air-outlet portion for discharge of air which are disposed along a longitudinal axis of said head, comprising the step of causing said magnetic head being brought close to said magnetic recording medium to float above a surface of said magnetic recording medium and satisfy the following conditions when reaching a region of air flow occurring due to rotation of said magnetic recording medium:

$$+0.1° \leq \theta_P \leq +1.8°$$

$$-1.2° \leq \theta_R \leq +1.2°$$

$$VL \leq 100 \text{ [mm/sec]}$$

where $\theta_P$ represents a pitching angle of said magnetic head which is an angle made between said longitudinal axis of said magnetic head and said surface of said magnetic recording medium, said pitching angle taking a positive (+) angle when said air-inlet portion is more separated from said surface of said magnetic recording medium as compared with said air-outlet portion, $\theta_R$ designates a rolling angle of said magnetic head which is an angle made between said surface of said magnetic recording medium and a traversal axis perpendicular to said longitudinal axis of said magnetic head, said rolling angle taking a positive (+) angle when a portion of said magnetic head which is on said traversal axis and far away from a center of said magnetic recording medium is more separated from said surface of said magnetic recording medium as compared with a portion thereof which is on said traversal axis and near the center of said magnetic recording medium; and VL denotes a speed of said magnetic head taken when being brought close to said magnetic recording medium.

14. A method of loading a magnetic head with respect to a magnetic recording medium which head is equipped with an air-inlet portion for introduction of air and an air-outlet portion for discharge of air which are disposed along a longitudinal axis of said head, comprising the step of causing said magnetic head being brought close to said magnetic recording medium to float above a surface of said magnetic recording medium so as to satisfy the following conditions due to rotation of said magnetic recording medium:

$$+0.15° \leq \theta_P \leq +1.5°$$

$$-0.6° \leq \theta_R \leq +0.6°$$

$$VL \leq 50 \text{ [mm/sec]}$$

where $\theta_P$ represents a pitching angle of said magnetic head which is an angle made between said longitudinal axis of said magnetic head and said surface of said magnetic recording medium, said pitching angle taking a positive (+) angle when said air-inlet portion is more separated from said surface of said magnetic recording medium as compared with said air-outlet portion, $\theta_R$ designates a rolling angle of said magnetic head which is an angle made between said surface of said magnetic recording medium and a traversal axis perpendicular to said longitudinal axis of said magnetic head, said rolling angle taking a positive (+) angle when a portion of said magnetic head which is on said traversal axis and far away from a center of said magnetic recording medium is more separated from said surface of said magnetic recording medium as compared with a portion thereof which is on said traversal axis and near the center of said magnetic recording medium; and VL denotes a speed of said magnetic head taken when being brought close to said magnetic recording medium.

15. A magnetic disc apparatus comprising a magnetic disc, an arm movable in directions substantially parallel to a surface of said magnetic disc, a flexible member, one end portion of which is attached to said arm, a magnetic head attached through a gimbal to the other end portion of said flexible member, wherein said magnetic head is equipped with an air-inlet portion for introduction of air and an air-outlet portion for discharge of air which are disposed along a longitudinal axis of said head, and means for pressing said flexible member toward said magnetic disc to load said magnetic head above said magnetic disc and for causing said magnetic head being brought close to said magnetic disc to float above a surface of said magnetic disc so as to satisfy the following conditions when reaching a region of air flow occurring due to rotation of said magnetic disc:

$$+0.1° \leq \theta_P \leq +1.8°$$

$$-1.2° \leq \theta_R \leq +1.2°$$

$$VL \leq 100 \ [\text{mm/sec}]$$

where $\theta_P$ represents a pitching angle of said magnetic head which is an angle made between said longitudinal axis of said magnetic head and said surface of said magnetic disc, and pitching angle taking a positive (+) angle when said air-inlet portion is more separated from said surface of said magnetic disc as compared with said air-outlet portion; $\theta_R$ designates a rolling angle of said magnetic head which is an angle made between said surface of said magnetic disc and a traversal axis perpendicular to said longitudinal axis of said magnetic head, said rolling angle taking a positive (+) angle when a portion of said magnetic head which is on said traversal axis and far away from a center of said magnetic disc is more separated from said surface of said magnetic disc as compared with a portion thereof which is on said traversal axis and near the center of said magnetic disc, and VL denotes a speed of said magnetic head taken when being brought close to said magnetic disc.

16. A magnetic disc apparatus as claimed in claim 15, wherein said pressing means comprises a load pin for pressing said flexible member and driving means for moving said load pin.

17. A magnetic disc apparatus as claimed in claim 16, wherein said load pin is arranged to extend in a direction substantially parallel to said surface of said magnetic disc, and said driving means moves said load pin in a direction substantially perpendicular to said surface of said magnetic disc.

18. A magnetic disc apparatus as claimed in claim 16, wherein said driving means operates in response to a current introduced thereinto and changes a speed of the movement of said load pin in accordance with a value of the introduced current.

19. A magnetic disc apparatus as claimed in claim 18, wherein said driving means stops to operate said load pin when a predetermined time period is elapsed immediately after said magnetic head floats above said magnetic disc.

20. A magnetic disc apparatus comprising a magnetic disc, an arm movable in directions substantially parallel to a surface of said magnetic disc, a flexible member, one end portion of which is attached to said arm, a magnetic head attached through a gimbal to the other end portion of said flexible member, wherein said magnetic head is equipped with an air-inlet portion for introduction of air and an air-outlet portion for discharge of air which are disposed along a longitudinal axis of said head, and means for pressing said flexible member toward said magnetic disc to load said magnetic head above said magnetic disc and for causing said magnetic head being brought close to said magnetic disc to float above a surface of said magnetic disc so as to satisfy the following conditions when reaching a region of air flow occurring due to rotation of said magnetic disc:

$$+0.15° \leq \theta_P \leq +1.5°$$

$$-0.6° \leq \theta_R \leq +0.6°$$

$$VL \leq 50 \ [\text{mm/sec}]$$

where $\theta_P$ represents a pitching angle of said magnetic head which is an angle made between said longitudinal axis of said magnetic head and said surface of said magnetic disc, and pitching angle taking a positive (+) angle when said air-inlet portion is more separated from said surface of said magnetic disc as compared with said air-outlet portion; $\theta_R$ designates a rolling angle of said magnetic head which is an angle made between said surface of said magnetic disc and a traversal axis perpendicular to said longitudinal axis of said magnetic head, said rolling angle taking a positive (+) angle when a portion of said magnetic head which is on said traversal axis and far away from a center of said magnetic disc is more separated from said surface of said magnetic disc as compared with a portion thereof which is on said traversal axis and near the center of said magnetic disc, and VL denotes a speed of said magnetic head taken when being brought close to said magnetic disc.

21. A magnetic disc apparatus as claimed in claim 20, wherein said pressing means comprises a load pin for pressing said flexible member and driving means for moving said load pin.

22. A magnetic disc apparatus as claimed in claim 21, wherein said load pin is arranged to extend in a direction substantially parallel to said surface of said magnetic disc, and said driving means moves said load pin in a direction substantially perpendicular to said surface of said magnetic disc.

23. A magnetic disc apparatus as claimed in claim 21, wherein said driving means operates in response to a current introduced thereinto and changes a speed of the movement of said load pin in accordance with a value of the introduced current.

24. A magnetic disc apparatus as claimed in claim 23, wherein said driving means stops to operate said load pin when a predetermined time period is elapsed immediately after said magnetic head floats above said magnetic disc.

* * * * *